United States Patent
Dwivedi et al.

(10) Patent No.: US 9,019,943 B2
(45) Date of Patent: Apr. 28, 2015

(54) SYSTEMS AND METHODS OF COMMUNICATION USING TUNNELED DIRECT LINK SETUP (TDLS)

(75) Inventors: Ashwani Dwivedi, Andhra Pradesh (IN); Doo Seok Kim, Santa Clara, CA (US); Hoon Ki Lee, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 13/194,659

(22) Filed: Jul. 29, 2011

(65) Prior Publication Data
US 2012/0057577 A1    Mar. 8, 2012

Related U.S. Application Data

(60) Provisional application No. 61/368,980, filed on Jul. 29, 2010.

(51) Int. Cl.
| | | |
|---|---|---|
| *H04W 76/02* | (2009.01) | |
| *H04W 52/02* | (2009.01) | |
| *H04W 8/00* | (2009.01) | |
| *H04W 48/16* | (2009.01) | |
| *H04W 72/08* | (2009.01) | |
| *H04W 76/04* | (2009.01) | |

(52) U.S. Cl.
CPC ............ *H04W 76/023* (2013.01); *H04W 52/02* (2013.01); *H04W 8/005* (2013.01); *H04W 48/16* (2013.01); *H04W 72/085* (2013.01); *H04W 76/022* (2013.01); *H04W 76/048* (2013.01)

(58) Field of Classification Search
USPC ................ 370/328–338, 252, 311; 455/185.1
See application file for complete search history.

(56) References Cited

U.S. PATENT DOCUMENTS

| | | |
|---|---|---|
| 6,272,190 B1 | 8/2001 | Campana, Jr. |
| 6,580,700 B1 | 6/2003 | Pinard et al. |
| 6,977,915 B2 | 12/2005 | Chen et al. |
| 7,200,395 B2 | 4/2007 | Backes |
| 7,545,771 B2 | 6/2009 | Wentink et al. |
| 7,616,594 B2 | 11/2009 | Roberts et al. |
| 7,760,703 B2 | 7/2010 | Kubler et al. |
| 7,804,849 B2 | 9/2010 | Mahany et al. |
| 7,920,535 B2 | 4/2011 | Zaks |
| 7,961,659 B2 | 6/2011 | Zaks |
| 7,995,546 B2 | 8/2011 | Walker et al. |
| 8,064,374 B2 | 11/2011 | Kakani et al. |
| 8,259,632 B2 | 9/2012 | Seok et al. |
| 8,295,196 B2 | 10/2012 | Ergen et al. |
| 8,310,978 B2 | 11/2012 | Itagaki et al. |
| 8,400,955 B2 | 3/2013 | Singh et al. |
| 2004/0202130 A1 | 10/2004 | Backes et al. |
| 2006/0019663 A1 | 1/2006 | Cuffaro et al. |
| 2006/0165035 A1 | 7/2006 | Chandra et al. |
| 2007/0008922 A1* | 1/2007 | Abhishek et al. ............. 370/329 |
| 2007/0110002 A1* | 5/2007 | Yang et al. .................... 370/335 |
| 2007/0201410 A1 | 8/2007 | Ginzburg |
| 2007/0281641 A1* | 12/2007 | Kim et al. .................. 455/185.1 |
| 2008/0031204 A1* | 2/2008 | Sood ............................. 370/338 |
| 2008/0069047 A1 | 3/2008 | Yee et al. |
| 2008/0159143 A1 | 7/2008 | Nagarajan et al. |

(Continued)

*Primary Examiner* — Benjamin H Elliot, IV
*Assistant Examiner* — Vincelas Louis
(74) *Attorney, Agent, or Firm* — James K. O'Hare

(57) ABSTRACT

Systems and methods for improved communications using tunneled direct link setup are described herein. The systems and methods relate to discovery, link setup, channel switching, multicasting, link selection, and quality of service implemented in conjunction with tunneled direct link setup.

24 Claims, 20 Drawing Sheets

(56) References Cited

U.S. PATENT DOCUMENTS

| | | |
|---|---|---|
| 2008/0186901 A1 | 8/2008 | Itagaki et al. |
| 2009/0135731 A1 | 5/2009 | Secades et al. |
| 2009/0274301 A1 | 11/2009 | Otte et al. |
| 2010/0008274 A1* | 1/2010 | Kneckt et al. ............... 370/311 |
| 2010/0014458 A1 | 1/2010 | Singh et al. |
| 2010/0166010 A1 | 7/2010 | Ukita et al. |
| 2010/0177712 A1* | 7/2010 | Kneckt et al. ............... 370/329 |
| 2010/0232312 A1 | 9/2010 | Kubler et al. |
| 2010/0255869 A1 | 10/2010 | Sood |
| 2010/0315945 A1 | 12/2010 | Matuszewski et al. |
| 2011/0034127 A1 | 2/2011 | Wentink et al. |
| 2011/0069689 A1 | 3/2011 | Grandhi et al. |
| 2011/0102157 A1 | 5/2011 | Tarkoma |
| 2011/0110349 A1 | 5/2011 | Grandhi |
| 2011/0122783 A1 | 5/2011 | Lin et al. |
| 2011/0145421 A1 | 6/2011 | Yao et al. |
| 2011/0158216 A1 | 6/2011 | Zaks |
| 2011/0199901 A1 | 8/2011 | Kavanaugh et al. |
| 2011/0201374 A1 | 8/2011 | Periyalwar et al. |
| 2011/0243006 A1 | 10/2011 | Itagaki et al. |
| 2012/0014305 A1 | 1/2012 | Kakani et al. |
| 2012/0026997 A1* | 2/2012 | Seok et al. ............... 370/338 |
| 2012/0039200 A1 | 2/2012 | Lee et al. |
| 2012/0051240 A1 | 3/2012 | Dwivedi et al. |
| 2012/0057501 A1 | 3/2012 | Dwivedi et al. |
| 2012/0106452 A1 | 5/2012 | Kneckt et al. |
| 2012/0163235 A1 | 6/2012 | Ho et al. |
| 2012/0184284 A1 | 7/2012 | Moisio et al. |
| 2012/0195263 A1 | 8/2012 | Chandra et al. |
| 2013/0142059 A1 | 6/2013 | Di Girolamo et al. |

* cited by examiner

SYSTEMS AND METHODS OF COMMUNICATION USING TUNNELED DIRECT LINK SETUP (TDLS)

CROSS REFERENCE TO RELATED APPLICATION(S)

This application claims the benefit of U.S. Provisional Application No. 61/368,980, filed Jul. 29, 2010, the entire content of which is incorporated herein by reference. This application is related to U.S. application Ser. No. 13/194,751, titled "SYSTEMS AND METHODS OF COMMUNICATION USING TUNNELED DIRECT LINK SETUP (TDLS)," filed on even date herewith, and U.S. application Ser. No. 13/194,453, titled "SYSTEMS AND METHODS OF COMMUNICATION USING TUNNELED DIRECT LINK SETUP (TDLS)," filed on even date herewith, each of which are incorporated herein by reference, in their entirety.

BACKGROUND

1. Field

The present application relates generally to wireless communication devices, and more specifically to systems and methods that may be used in conjunction with tunneled direct link setup (TDLS) in a wireless local area network (WLAN).

2. Background

A wireless local area network (WLAN) is typically made up of a group of stations (STAs) that pass information amongst themselves and an access point (AP) via a network. The STAs and AP typically communicate wirelessly. The AP is typically connected to a wired network. The STAs and AP that communicate with each other are often referred to as a basic service set (BSS).

In a WLAN, the AP typically acts as a center for distribution. In a conventional WLAN, STAs are not normally allowed to communicate directly with each other, but must rely on the AP for the delivery of frames between STAs. However, in some cases STAs may transmit frames directly to one another using a data transfer technique referred to as Tunneled Direct Link Setup (TDLS).

SUMMARY

The systems, methods, and devices of the invention each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include systems and methods used in conjunction with tunneled direct link setup (TDLS).

One aspect of the disclosure provides a method implemented in a wireless apparatus. The method comprises communicating with an access point on an access point link having at least one quality of service parameter. The method further comprises communicating with another wireless apparatus on a direct link having at least one quality of service parameter. The at least one quality of service parameter for the direct link is the same as the at least one quality of service parameter for the access point link.

Another aspect of the disclosure provides a wireless apparatus. The wireless apparatus comprises a memory. The wireless apparatus further comprises a processor coupled to the memory. The memory and processor are cooperatively configured to communicate with an access point on an access point link having at least one quality of service parameter. The memory and processor are further cooperatively configured to communicate with another wireless apparatus on a direct link having at least one quality of service parameter. The at least one quality of service parameter for the direct link is the same as the at least one quality of service parameter for the access point link.

Another aspect of the disclosure provides a wireless apparatus. The wireless apparatus comprises means for communicating with an access point on an access point link having at least one quality of service parameter. The wireless apparatus further comprises means for communicating with another wireless apparatus on a direct link having at least one quality of service parameter. The at least one quality of service parameter for the direct link is the same as the at least one quality of service parameter for the access point link.

Another aspect of the disclosure provides a computer readable medium. The computer readable medium comprises instructions that when executed cause an apparatus to communicate with an access point on an access point link having at least one quality of service parameter. The instructions when executed further cause the apparatus to communicate with another wireless apparatus on a direct link having at least one quality of service parameter. The at least one quality of service parameter for the direct link is the same as the at least one quality of service parameter for the access point link.

DETAILED DESCRIPTION

Certain embodiments of the present disclosure provide techniques and apparatus for establishing tunneled direct link setup (TDLS) connections between stations in a wireless local area network (WLAN). The TDLS connections may be established in a manner that helps avoid collisions with hidden stations.

The word "exemplary" is used herein to mean "serving as an example, instance, or illustration." Any embodiment described herein as "exemplary" is not necessarily to be construed as preferred or advantageous over other embodiments. Also as used herein, the term "legacy stations" generally refers to wireless network nodes that support 802.11n or earlier versions of the IEEE 802.11 standard.

The techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

WLAN System

Figure 1:
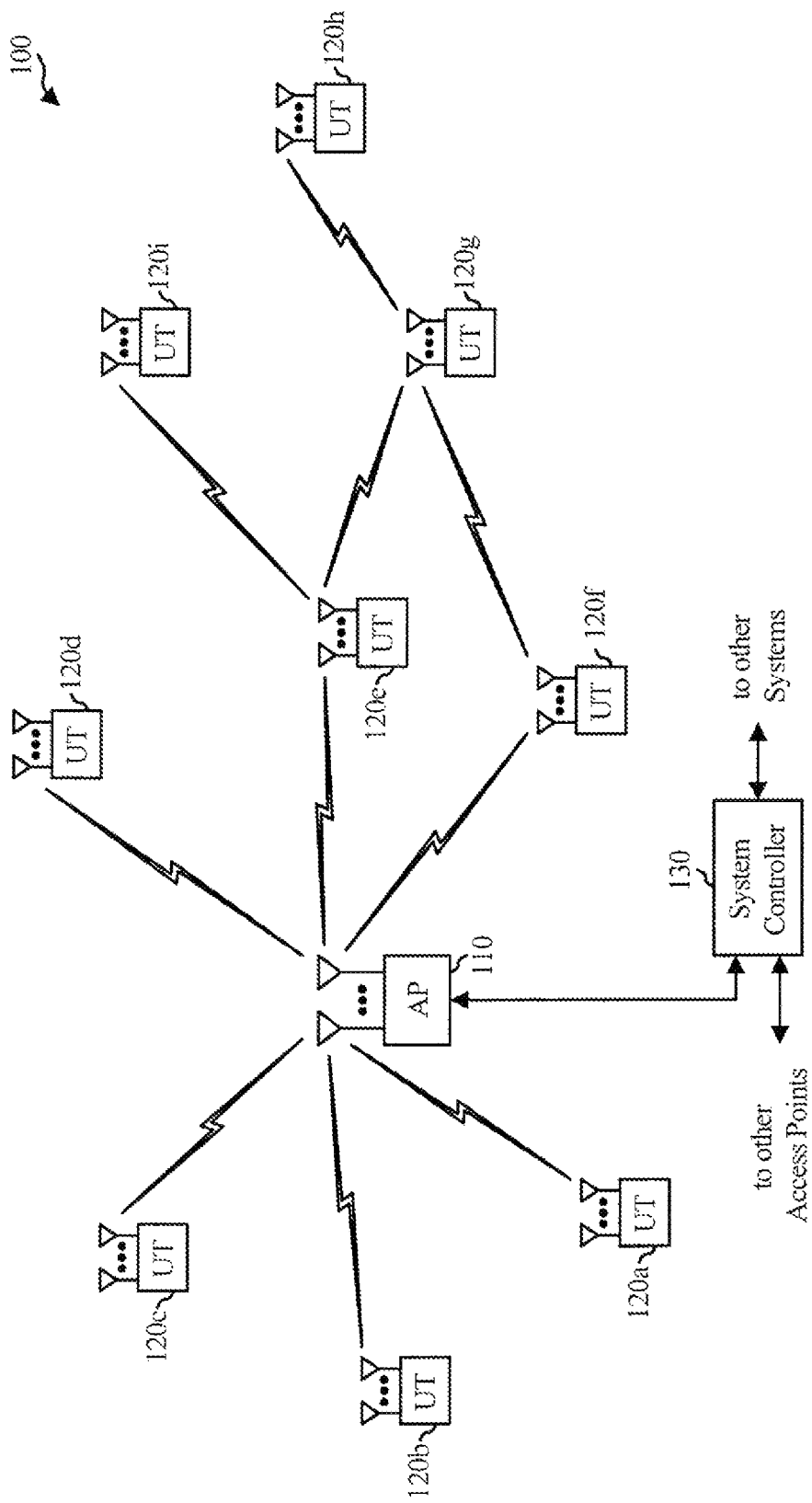
FIG. 1 shows a multiple-access WLAN system with access points and user terminals or stations (STAs).

FIG. 1 shows a multiple-access WLAN system 100 with access points and user terminals or stations (STAs). For simplicity, only one access point 110 is shown in FIG. 1. An access point (AP) is generally a fixed station that communicates with the user terminals, which may also be referred to as a base station or some other terminology. A user terminal may be fixed or mobile and may also be referred to as a mobile station (MS), a station (STA), a client, a wireless device, or some other terminology. A user terminal or STA may be a wireless device, such as a cellular phone, a personal digital assistant (PDA), a handheld device, a wireless modem, a laptop computer, a personal computer, or any other type of device capable of wireless communications.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

It will be noted that user terminals 120 may communicate directly with one another. Tunneled Direct Link Setup (TDLS) allows a STA to forward frames directly to another destination STA within a basic service set (BSS, controlled by the same AP). In various configurations, an access point is not required. For example, an independent BSS (IBSS) may be formed with any combination of STAs. Ad hoc networks of user terminals may be formed which communicate with each other via wireless network 120 using any of the communication formats known in the art.

For certain configurations, one or more of the user terminals 120 may be capable of communicating via spatial division multiple access (SDMA). For certain configurations, one or more of the user terminals 120 may not support SDMA. Thus, for such embodiments that include a combination of user terminals 120 that support SDMA and those that do not, an AP 110 may be configured to communicate with both SDMA and non-SDMA user terminals.

System 100 may utilize one or more transmit and one or more receive antennas for data transmission on the downlink and uplink. Access point 110 may be equipped with a number Nap of one or more antennas and represents the multiple-input (MI) for downlink transmissions and the multiple-output (MO) for uplink transmissions. A set Nu of selected user terminals 120 collectively represents the multiple-output for downlink transmissions and the multiple-input for uplink transmissions. For pure SDMA, it is desired to have Nap≥Nu≥1 if the data symbol streams for the Nu user terminals are not multiplexed in code, frequency, or time by some means. Nu may be greater than Nap if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $Nu_t \geq 1$). The Nu selected user terminals can have the same or different number of antennas.

System 100 includes time division duplex (TDD) systems and frequency division duplex (FDD) systems. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
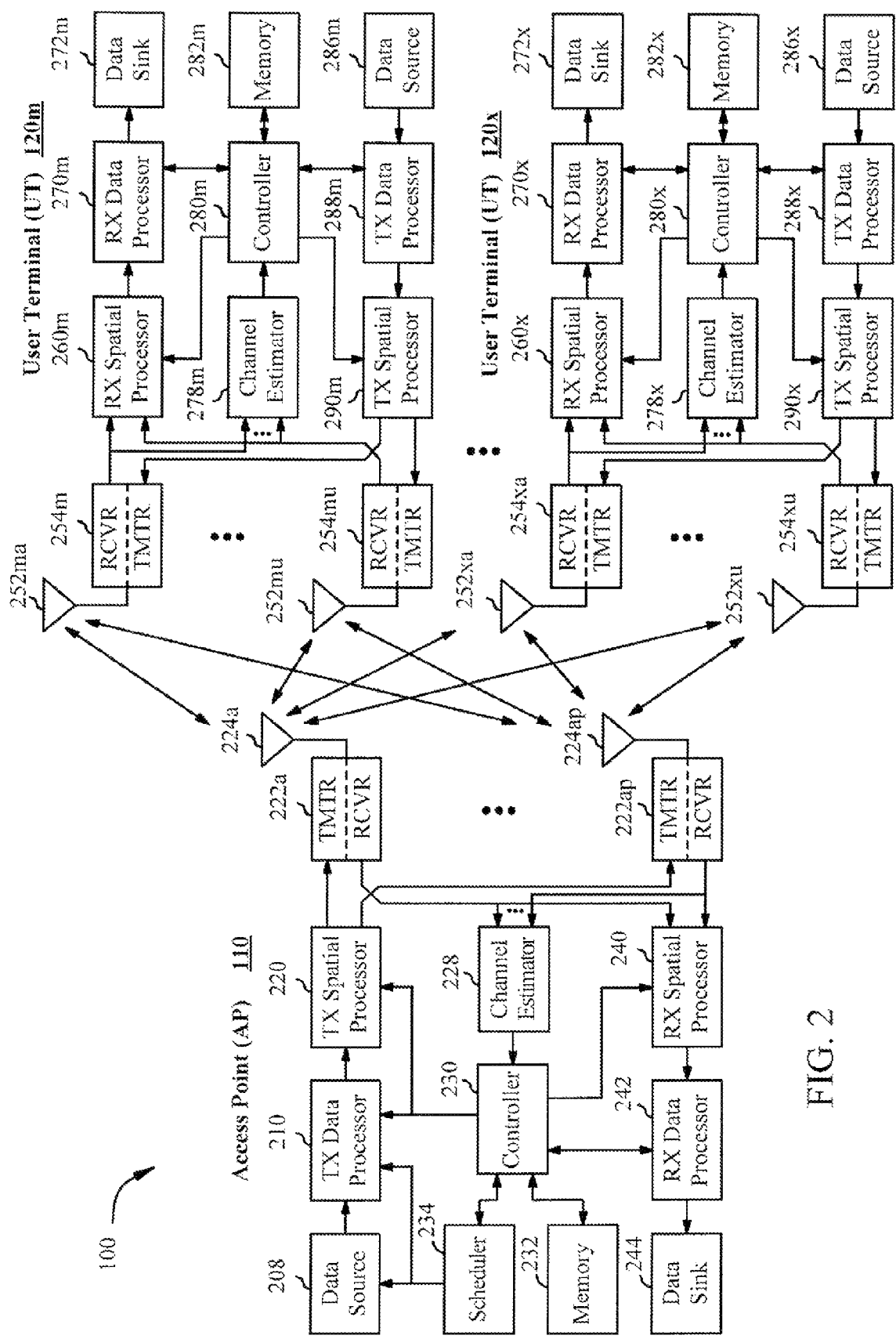
FIG. 2 is a block diagram showing an example of an access point and two user terminals.

FIG. 2 shows an example block diagram of access point 110 and two user terminals 120m and 120x. While a MIMO configuration is shown, the techniques described herein also apply to devices using a single transmit-receive antenna pair.

As illustrated, access point 110 is equipped with Nap antennas 224a through 224ap. User terminal 120m is equipped with $Nu_{t,m}$ antennas 252ma through 252mu, and user terminal 120x is equipped with $Nu_{t,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the "dn" denotes the downlink, the "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $Nu_{t,m}$ transmit symbol streams for the $Nu_{t,m}$ antennas. Each transmitter unit (TMTR) 254 receives and processes (e.g., converts to analog, amplifies, filters, and frequency upconverts) a respective transmit symbol stream to generate an uplink signal. $Nu_{t,m}$ transmitter units 254 provide $Nu_{t,m}$ uplink signals for transmission from $Nu_{t,m}$ antennas 252 to the access point 110.

A number Nup of user terminals may be scheduled for simultaneous transmission on the uplink. Each of these user terminals performs spatial processing on its data symbol stream and transmits its set of transmit symbol streams on the uplink to the access point.

At access point 110, Nap antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the Nap received symbol streams from Nap receiver units 222 and provides Nup recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing on the Ndn downlink data symbol streams, and provides Nap transmit symbol streams for the Nap antennas. Each transmitter unit (TMTR) 222 receives and processes a respective transmit symbol stream to generate a downlink signal. Nap transmitter units 222 provide Nap downlink signals for transmission from Nap antennas 224 to the user terminals.

At each user terminal 120, $Nu_{t,m}$ antennas 252 receive the Nap downlink signals from access point 110. Each receiver unit (RCVR) 254 processes a received signal from an associated antenna 252 and provides a received symbol stream. An RX spatial processor 260 performs receiver spatial processing on $Nu_{t,m}$ received symbol streams from $Nu_{t,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
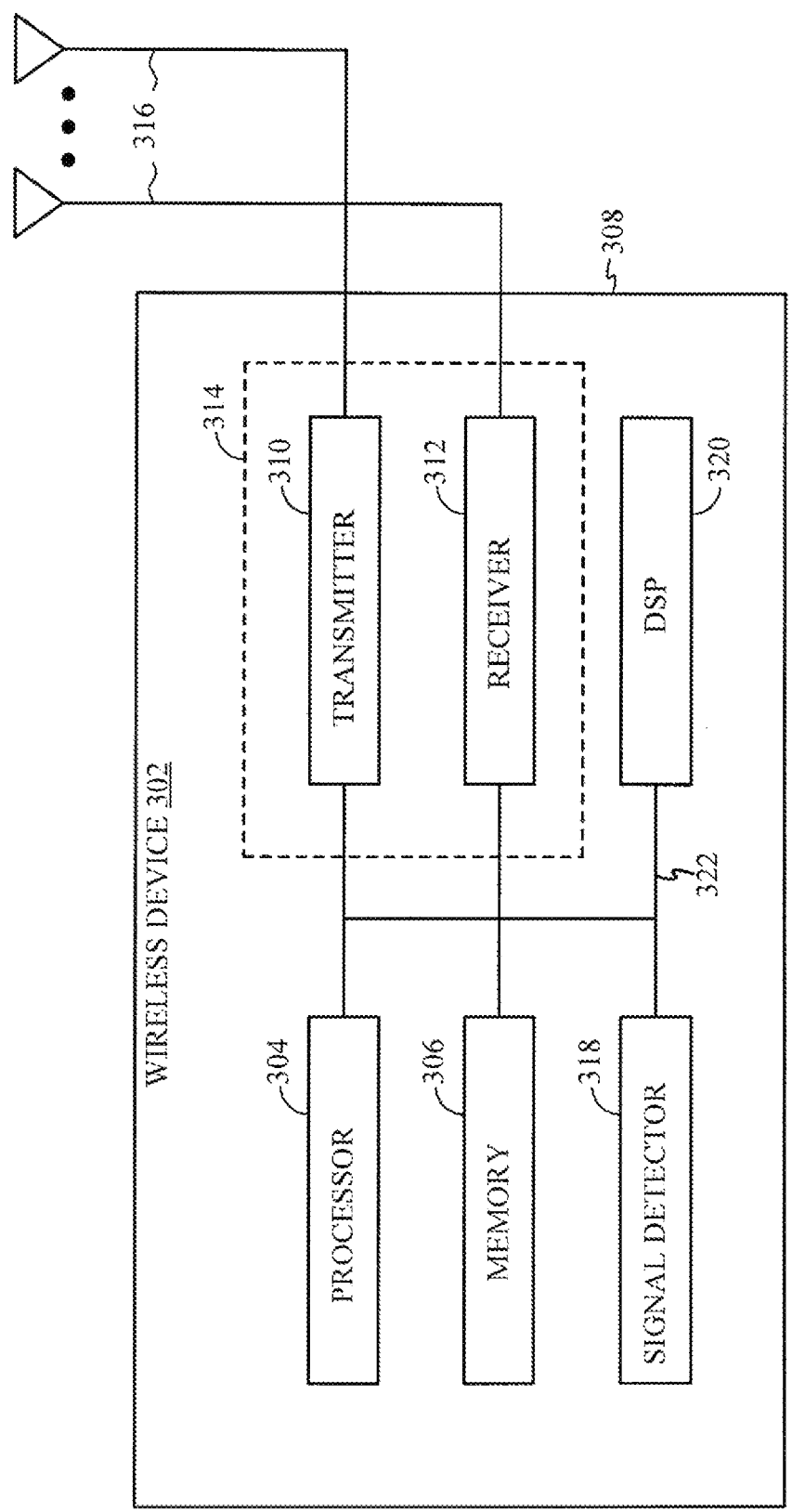
FIG. 3 illustrates various components that may be utilized in a wireless device employable in the system of FIG. 1.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
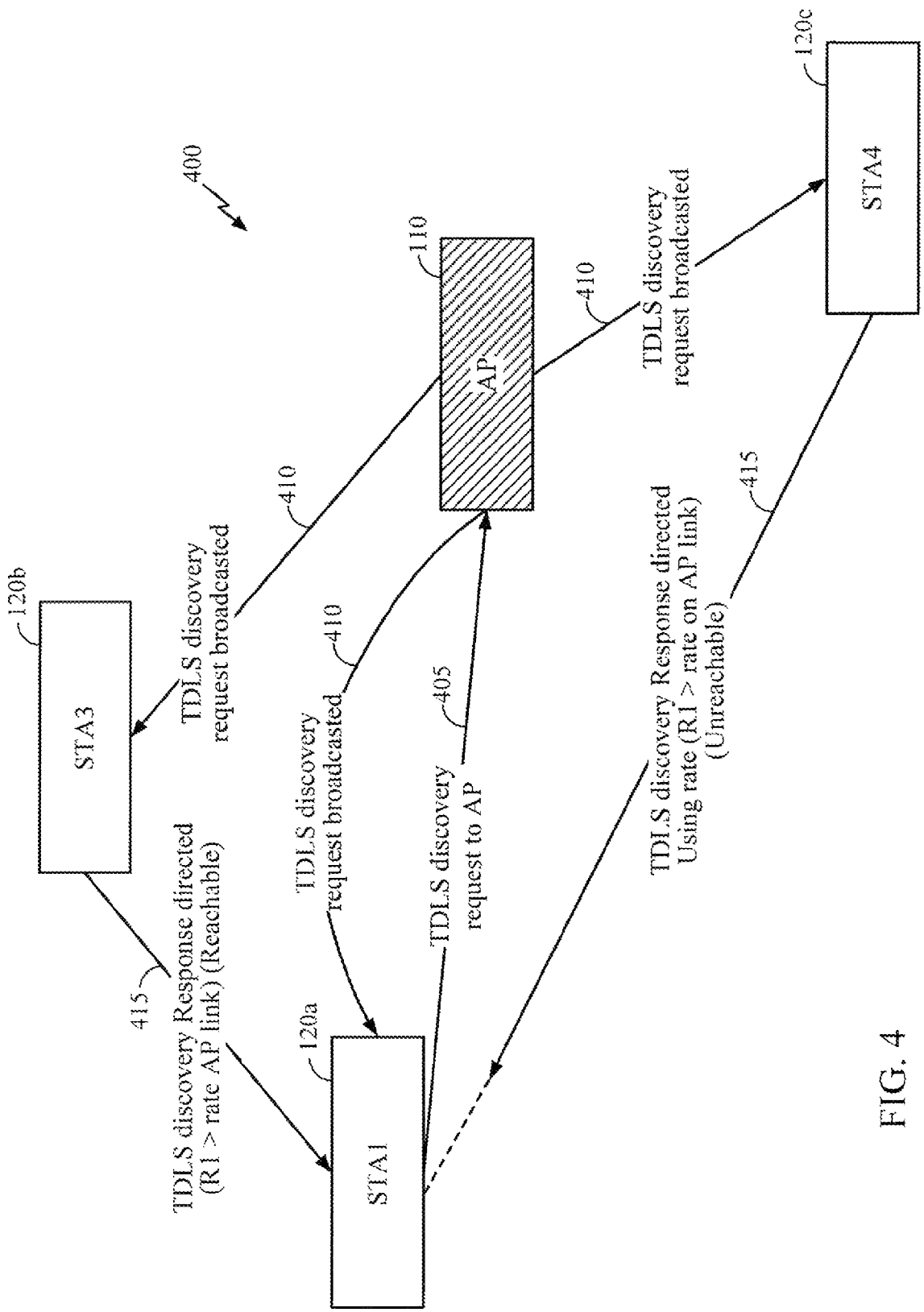
FIG. 4 illustrates an example of a basic service set (BSS) including an access point (AP) and a plurality of stations (STAs).

FIG. 4 illustrates a basic service set (BSS) 400 that includes an access point (AP) 110 and a plurality of stations (STAs) 120a-120c. In the BSS 400, the STAs 120a-120c may communicate through the AP 110 via one or more AP links, where an AP link is a data link between two STAs 120a-120c through the AP 110. Further, the STAs 120a-120c may form a direct link and communicate directly between each other. One method of discovering STAs 120a-120c with which to setup such a direct link is through Tunneled Direct Link Setup (TDLS) discovery. In one embodiment, TDLS discovery occurs by an initiator STA 120a broadcasting (or unicasting) a discovery request message to the other STAs 120b, 120c in the BSS 400 through AP links. STA 120a, the TDLS discovery initiator, transmits a TDLS discovery request 405 to the AP 110, which then sends the TDLS discovery request 410 to each of STA 120b and STA 120c. Typically, the TDLS responders, STA 120b and STA 120c, send a discovery response frame at a low data rate, often leading to the use of more air bandwidth and a lower link quality measurement. Since the STA 120a only sets up a direct link if it has a higher link quality than the AP link, it is therefore likely that the STA 120a will reject the direct link setup. FIG. 4, illustrates an embodiment of a TDLS response procedure, where the TDLS responders, STA 120b and STA 120c, advantageously respond to the discovery request with an appropriate data rate. In particular, the TDLS responders choose a rate that provides the following benefits: 1) the responders can evaluate direct link quality, 2) avoidance of unnecessary processing of discovery responses by the STA that sends the discover request, and 3) improved network throughput. In an embodiment, the data rate is based on the TDLS responders STA 120b and STA 120c maintaining the history of packet error rate (PER) corresponding to different data rates exchanged with the AP. The TDLS responders STA 120b and STA 120c then each create a set of rates with which to send a discovery response to the TDLS initiator STA 120a. The set of rates range from the estimated highest sustainable data rate with the AP 110 (Rmax_ap) to the maximum data rate supported by the TDLS responder STA 120b or STA 120c (Rmax). The TDLS responder STA 120b or STA 120c then transmits a discovery response 415 directly to the TDLS initiator STA 120a with a rate starting at Rmax. If the transmission fails, the TDLS responder STA 120b or STA 120c retries at a lower rate from the set of rates until Rmax_ap. If the transmission is successful at any rate from the set of rates, the TDLS responder STA 120b or STA 120c can set up a direct link with the TDLS initiator 120a. Based on this procedure, the TDLS initiator 120a only processes responses that are at a rate higher than the rate used for communicating with the AP 110, and therefore only processes responses that may actually lead to the setup of a direct link.

The TDLS responder STA 120b or STA 120c may further prioritize links between different TDLS initiators. For example, if the TDLS responder STA 120c sends a successful discovery response to STA 120b at rate R1 and sends a successful discovery response to STA 120a at rate R2, and R1>R2, then the priority for STA 120c of setting up a direct link with STA 120b is greater than the priority of setting up a direct link with STA 120a.

Figure 5:
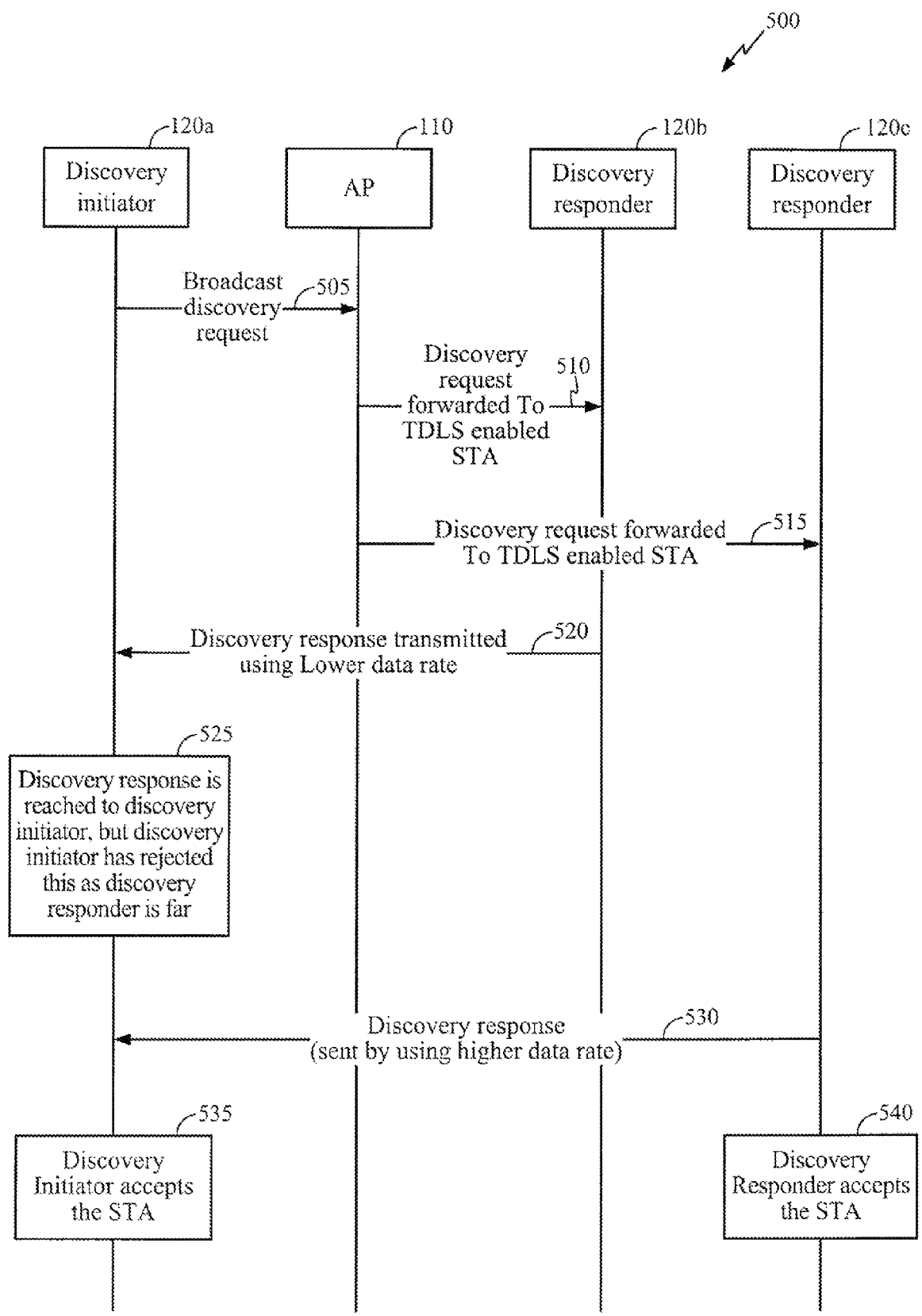
FIG. 5 illustrates a signal flow diagram for an example TDLS discovery process.

FIG. 5 illustrates an example TDLS discovery process. Signal flow between devices is shown using horizontal arrows. Time increases vertically from the top of the page to the bottom of the page. As shown at 505, a STA 120a transmits a discovery request message to an AP 110. At 510, the AP 110 forwards the discovery request to a STA 120b. The AP 110 also forwards the discovery request to the STA 120c at 515. Here, the STA 120b is configured to use the conventional procedure of transmitting a response at a low rate. The STA 120c is configured to transmit a response at a high data rate between Rmax and Rmax_ap as discussed above. Continuing at 520, the STA 120b responds at a low data rate to the STA 120a. At 525, the STA 120a rejects the discovery response of the STA 120b after processing the response. Since the response was sent at a low data rate, it is likely to be successfully received by the STA 120a whether or not channel conditions are noisy, though the STA 120a cannot determine channel conditions based only on the fact the response is received. Accordingly, the STA 120a may unnecessarily process responses in the expectation that the channel is noisy when it is in reality not. At 530, the STA 120c transmits a discovery response at a higher data rate. The procedure at 530 may be repeated multiple times as discussed above with different rates between Rmax and Rmax_ap. At 535, the STA 120a, which successfully receives the discovery response from the STA 120c at the higher data rate used, accepts the STA 120c as a candidate for TDLS link setup. Further, at 540, the STA 120c accepts the STA 120a as a potential STA to setup a direct link with as the data rate is within the acceptable range of Rmax and Rmax_ap. If at 530, the transmission of the discovery response to the STA 120a is unsuccessful, the STA 120a determines that STA 120c is not a TDLS direct link setup candidate as it assumes the direct link is of poor quality causing the response to be lost. Further, the STA 120c is assured that a link is not formed with the STA 120a at a low rate as it should not send a response at a rate that is not between Rmax and Rmax_ap.

Figure 6:
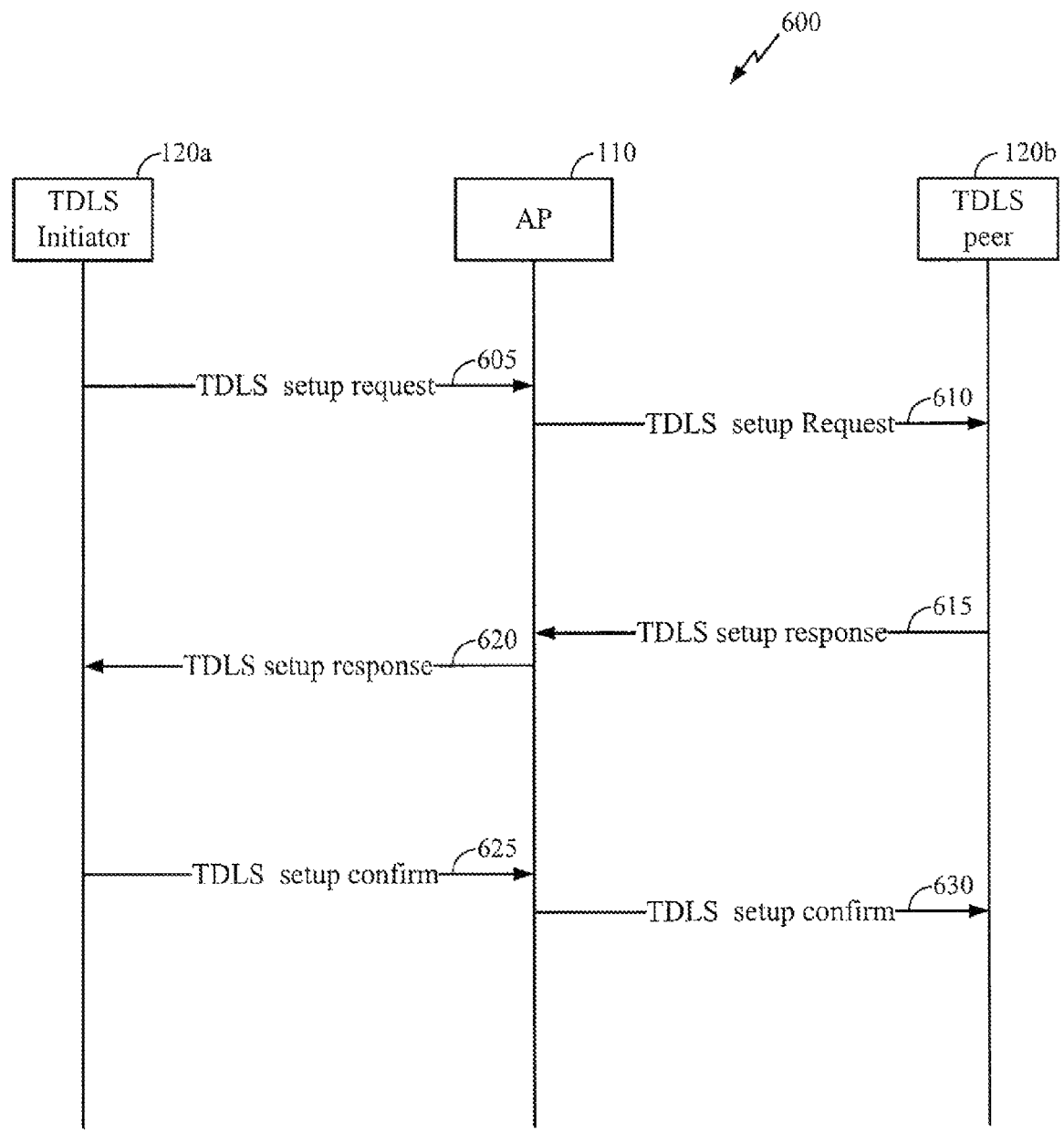
FIG. 6 illustrates an example process for setting up a TDLS link.

FIG. 6 illustrates an example process for setting up a TDLS link. In an embodiment, a TDLS link is set up by a TDLS initiator STA 120a selecting a best peer STA 120b based on a priority (such as based on the rate at which a discovery response is received as discussed above), and transmitting a TDLS setup request frame 605 to an AP 110, which transmits the TDLS setup request frame 610 to the peer STA 120b. The peer STA 120b responds with a TDLS response message 615 to the AP 110, which forwards a TDLS response message 620 to the initiator STA 120a with a 'SUCCESS' code. The initiator STA 120a sends a TDLS setup confirm message 625 to the AP 110, which forwards a confirm message 630 to the peer STA 120b. In an embodiment, all of the messages described are sent on AP links through the AP 110 as shown. Accordingly, the TDLS link is formed between the initiator STA 120a and the peer STA 120b.

Typically, if link quality on the direct link degrades, a STA communicating on the direct link sends a TDLS teardown frame to the other STA communicating. The STAs then communicate on the AP link. When direct link quality improves, the STAs must again perform a TDLS link setup. Therefore, switching between a direct link and an AP link requires substantial overhead.

Figure 7A:
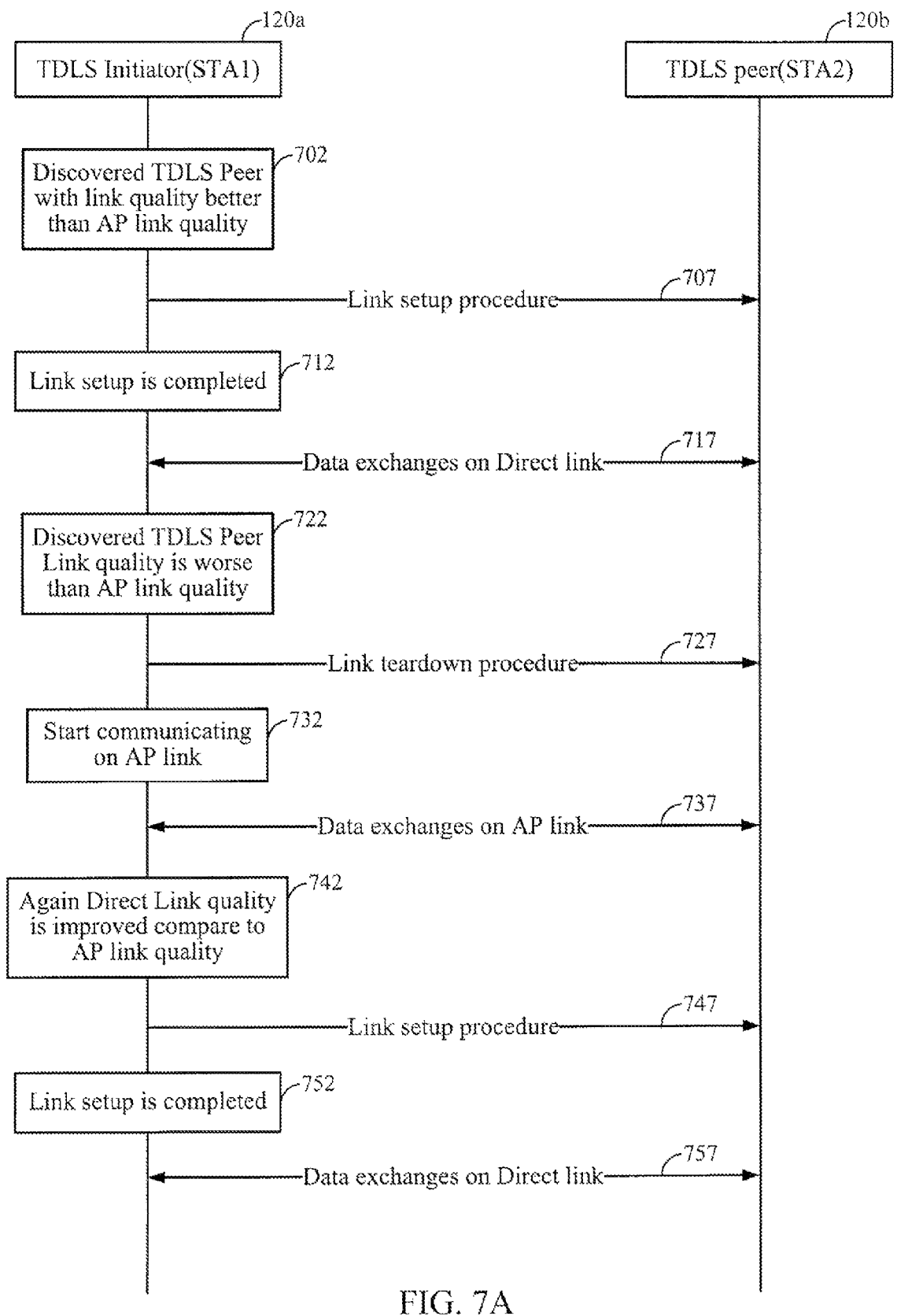
FIG. 7A illustrates a typical process for switching between a direct link and an AP link.

FIG. 7A illustrates a process for switching between a direct link and an AP link. At 702, a STA 120a discovers a peer STA 120b using TDLS discovery procedures such as those described herein. The peer STA 120b may have a better link quality over a direct link with the STA 120a than over an AP link. At 707, STA 120a sends a link setup request to the STA 120b. At 712, the link between STA 120a and 120b is set up. At 717, data are exchanged over the direct link between the STA 120a and STA 120b. At 722, the STA 120a determines that the link quality over the direct link with the STA 120b is worse than the link quality over the AP link with the STA 120b. At 727, the STA 120a initiates and completes a link teardown procedure with the STA 120b to teardown the direct link between the STA 120a and 120b. At 732, the STA 120a and the STA 120b begin communicating over the AP link. At 737, the STA 120a and the STA 120b exchange data over the AP link. At 742, the STA 120a determines that the peer STA 120b has a better link quality over a direct link with the STA 120a than over the AP link. At 747, STA 120a sends a link setup request to the STA 120b. At 752, the link between STA 120a and 120b is set up. At 757, data are exchanged over the direct link between the STA 120a and STA 120b. Accordingly, as discussed above, switching between a direct link and an AP link typically requires the additional overhead of tearing down and setting up a link several times, leading to significant overhead costs in the case of highly mobile environments where link quality fluctuation is more frequent, requiring the procedure to be performed often.

Figure 7B:
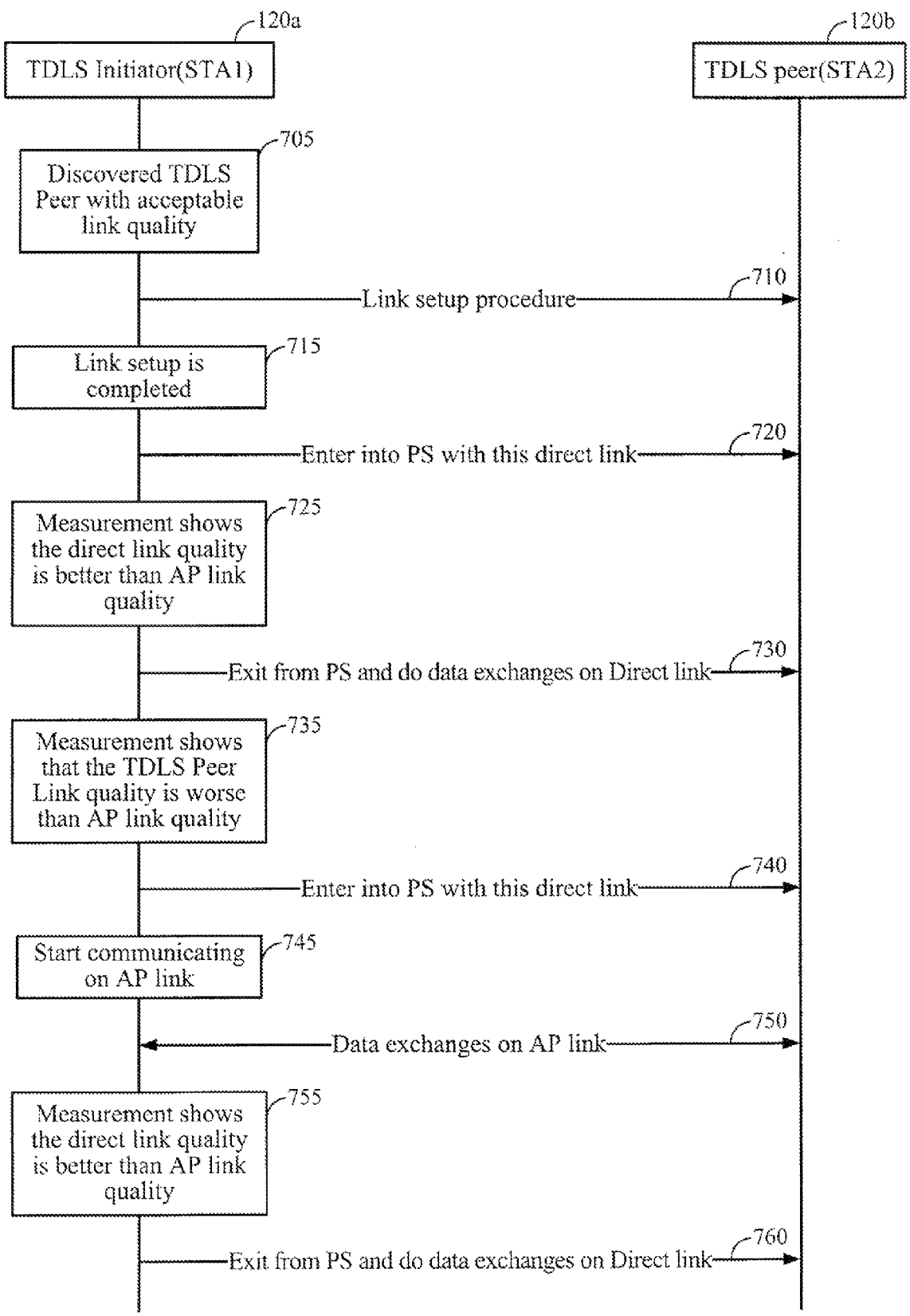
FIG. 7B illustrates an example process for maintaining a direct link between STAs instead of requiring a teardown.

FIG. 7B illustrates an example process for maintaining a direct link between STAs instead of requiring a teardown. In an embodiment, the STAs may then switch between direct link and AP link based on the quality of the links with reduced overhead. At 705, a STA 120a discovers a peer STA 120b using TDLS discovery procedures such as those described herein. At 710, STA 120a sends a link setup request to the STA 120b. At 715, the link between STA 120a and 120b is set up. At 720, the STA 120a sends a signal to the STA 120b to enter a power save (PS) mode for the direct link. At 725, the STA 120a then measures and determines the link quality of the direct link is better than the link quality of the AP link. At 730, the STA 120a transmits a quality of service (QoS) NULL frame with the power management (PM) bit cleared on the direct link to the STA 120b. Accordingly, the direct link is no longer in PS mode, and the STAs communicate on the direct link. At 735, the STA 120a measures link quality on the direct link and the AP link with STA 120b and determines that the AP link is of higher quality. At 740, the STA 120a transmits a QoS NULL frame with a PM bit set in order to put the direct link into a power save (PS) mode, and at 745, the STAs communicate over the AP link. At 750, the STA 120a determines that the link quality of the direct link is now better than the link quality of the AP link. At 755, the STA 120a transmits a QoS NULL frame with the PM bit cleared on the direct link to the STA 120b. Accordingly, the direct link is no longer in PS mode. At 760, the STA 120a then sends a unicast TDLS discovery request frame to STA 120b using the same access category (AC) as the data being transmitted over the AP link currently. The STAs then cease sending data on the AP link and start sending data on the direct link once the STA 120b successfully receives the discovery response from the STA 120a. If link quality on the direct link deteriorates again, the direct link is put back into power save mode and communication takes place over the AP link. According to the above process, reordering of frames at the STA 120b caused by switching between the AP link and the direct link using teardown procedures may be prevented. Frame reordering may occur when a frame sent through the AP link is buffered at the AP 110 and is therefore transmitted out of order from a frame later sent on the direct link, for example. Waiting for the discovery response before starting transmission on the direct link prevents frame reordering as the discovery request is transferred over the AP link before frames are sent over the direct link, meaning that any previously buffered data at the AP 110 has also been transferred over the AP link.

In an embodiment, at the data receiving side (STA 120b), if the direct link quality is worse than AP link quality, then no frames are buffered to be sent over the direct link, and all frames are send over then AP link. Further, no traffic indications for traffic over the direct link are sent. If the direct link quality is better than the AP link quality, the STA 120b buffers data to be sent over the direct link after sending a peer traffic indication (PTI) frame to STA 120a.

Figure 8A:
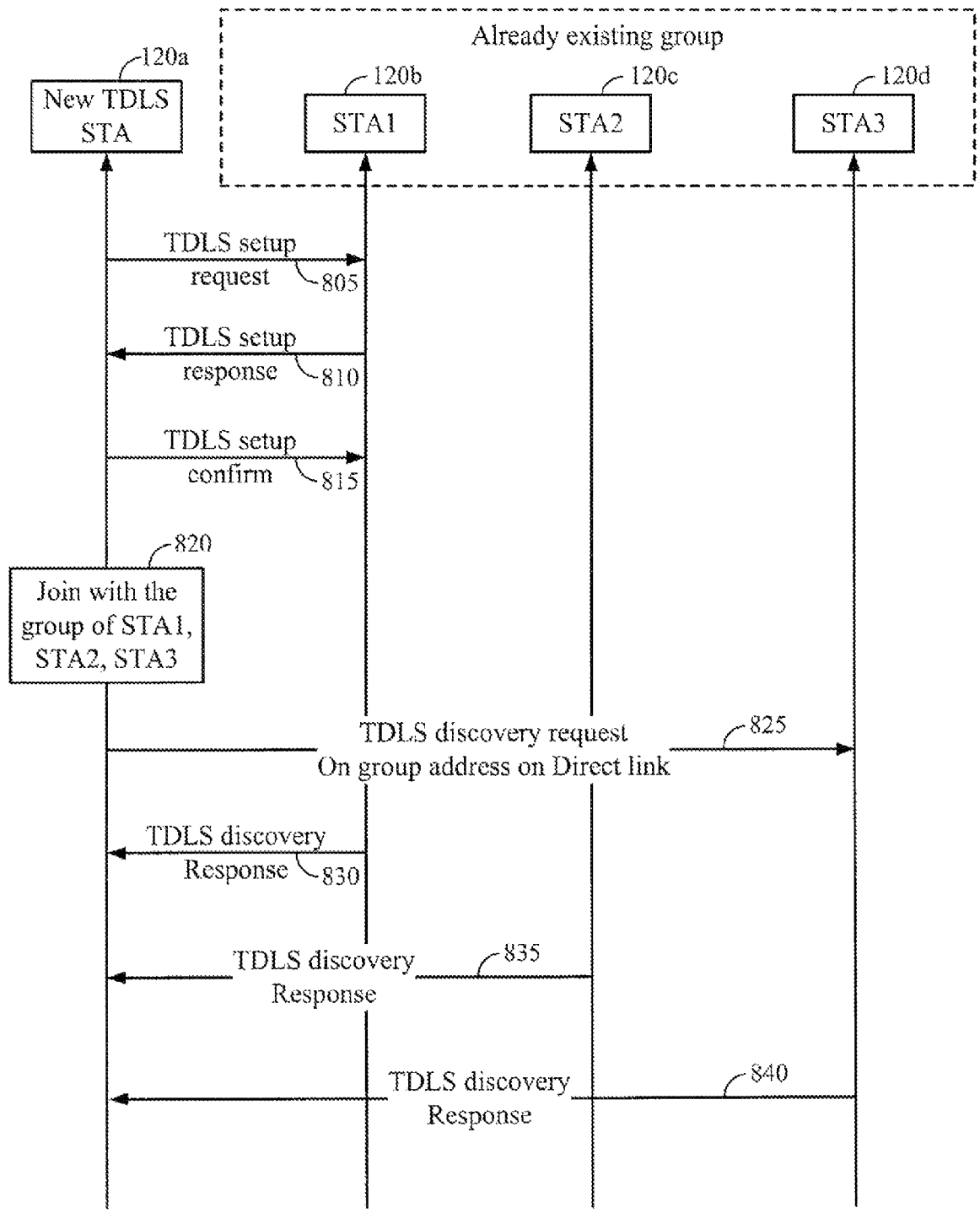
FIG. 8A illustrates an example process for creating a group link between multiple STAs.

FIG. 8A illustrates an example process for creating a group link between multiple STAs. Thus far, TDLS direct links have been described between two STAs. Accordingly, STAs may unicast messages between each other over the direct link. In an embodiment, using a group link, the STAs may multicast the data to multiple STAs in the group. According to an embodiment, an initiating STA 120a that wants to create a multicast link setup generates a pseudo group media access control (MAC) address. According to an aspect of the present invention, a pseudo group address may include as the first three bytes the first 3 bytes from the BSSID. The next two bytes may be the first two bytes of the actual MAC address of the STA generating the pseudo group MAC address. The last byte may be randomly generated number with multicast/group address bit(s) cleared to avoid generation of actual multicast or broadcast frames. At 805, a new TDLS STA 120a initiates a TDLS link with another STA 120b, and includes the generated group MAC address in the TDLS setup request sent to STA 120b. At 810, if the STA 120b does not have an existing group, the STA 120b responds with a TDLS setup response message with the received group MAC address. At 815, the STA 120a confirms the group setup with the pseudo group MAC address generated by the STA 120a. The STA 120a therefore joins a group with the STA 120b at 820. The STA 120b and the new STA are therefore part of the same group.

If at 810, the STA 120b has an existing group, the STA 120b may respond with the group MAC address of the existing group. The new TDLS STA 120a receiving the group MAC address for the existing group may then confirm receipt of the existing group MAC address at the step 815. The STA 120a therefore joins a group with the STA 120b at 820. At 825, the STA 120a may multicast a discovery request to each of the STAs (STA 120b, STA 120c, STA 120d) of the existing group using the group MAC address for the existing group. At 830, STA 120b responds to the discovery request and transmits a discovery response to the STA 120a. The STA 120a may measure the signal strength of the discovery response and add the STA 120b to the list of available STAs through the group MAC address. Further at the step 835, STA 120c responds to the discovery request and transmits a discovery response to the STA 120a. The STA 120a may measure the signal strength of the discovery response and add the STA 120c to the list of available STAs through the group MAC address. At 840, STA 120d responds to the discovery request and transmits a discovery response to the STA 120a. The STA 120a may measure the signal strength of the discovery response and add the STA 120d to the list of available STAs through the group MAC address.

Using the group MAC address setup procedure, data, teardown requests, and other messages can be sent from one STA to all the STAs in the group through multicast using the group MAC address.

STAs (e.g., STA 120a and STA 120b) may be configured to communicate over a plurality of different channels. For example, STAs 120a and 120b may communicate with devices in the 5 GHz spectrum and the 2.4 GHz spectrum. The STAs 120a and 120b may communicate over different communication channels on each spectrum. During TDLS link setup, STAs 120a and 120b may include in the TDLS setup request and the TDLS setup response frames, information regarding supported channels and supported regulatory classes. Accordingly, each STA is aware of the channels supported by the other STA with which a direct link exists.

Figure 8B:
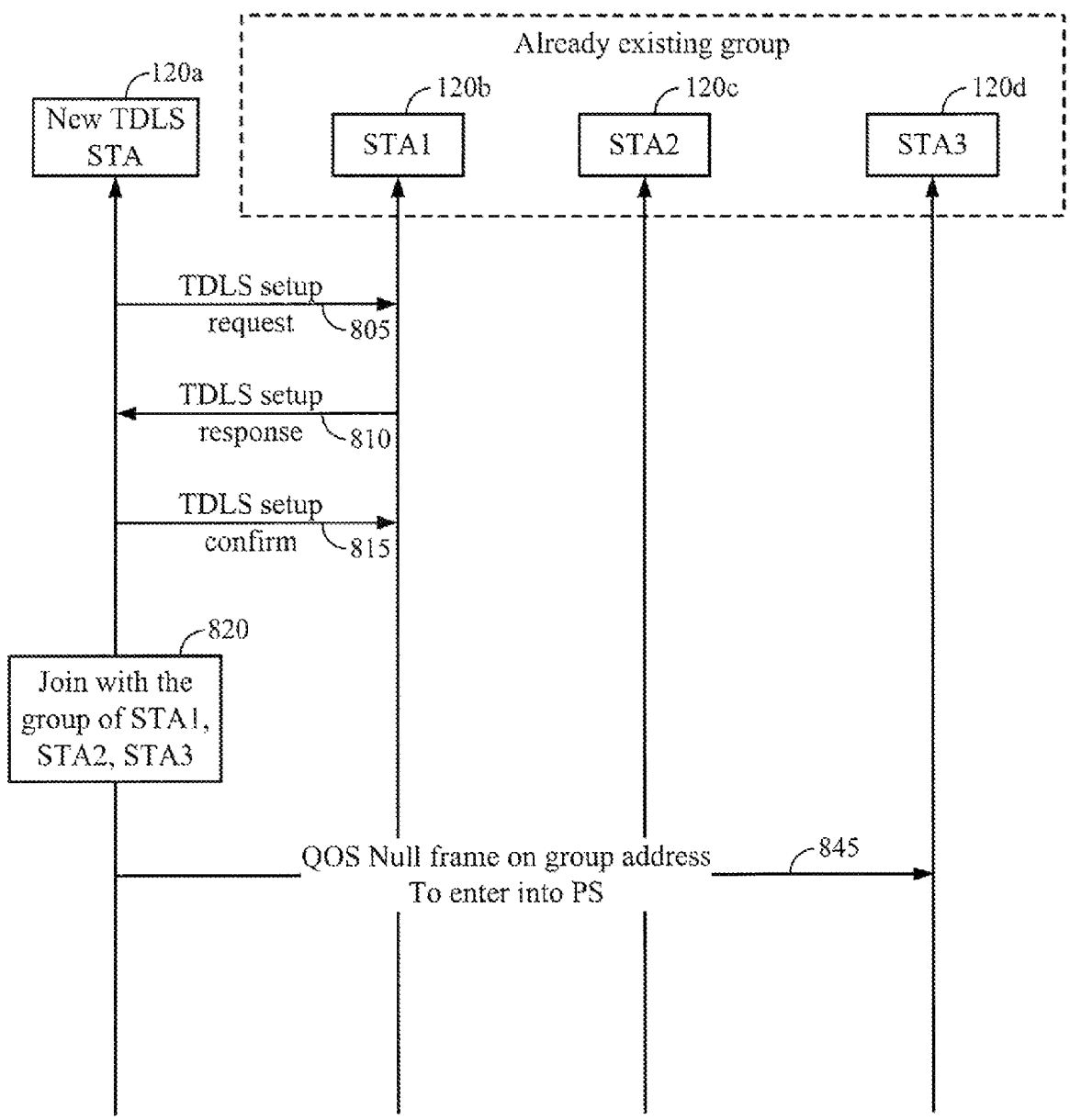
FIG. 8B illustrates an example process of entering into a power save mode using a group address.

FIG. 8B illustrates an example process of entering into a power save mode using a group address. As discussed above with respect to FIG. 7B, STAs may enter a power save mode with respect to one or more links. Further, as discussed with respect to FIG. 8A, STAs may form a group using a group MAC address setup procedure and multicast data from one STA to all the STAs in the group using the group MAC address. Thus, to enter into a power save mode using a group address, STAs form a group, such as according to procedures described by 805-820 above with respect to FIG. 8A. At 845, the STA 120a may transmit a QoS NULL frame on the group MAC address. Thus, the direct links between the STA 120a and each of STAs 120b, 120c, and 120d, are put in a power save mode.

Figure 8C:
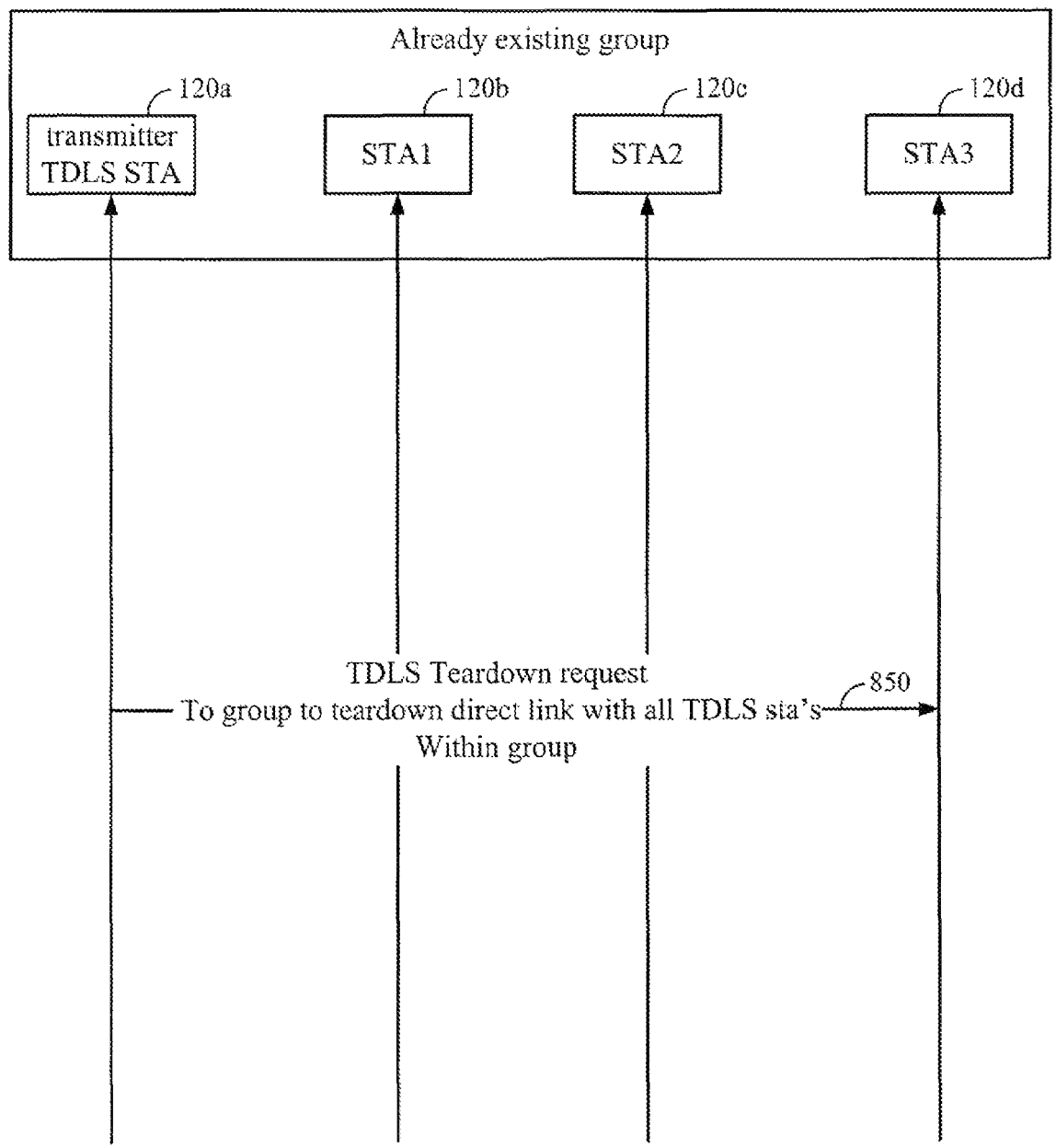
FIG. 8C illustrates an example process of tearing down a group link between multiple STAs.

FIG. 8C illustrates an example process of tearing down a group link between multiple STAs. The process of FIG. 8C assumes that a group has been formed between STAs 120a, 120b, 120c, and 120d, such as according to the process described above with respect to FIG. 8A. At 850, the STA 120a transmits a teardown request using the group MAC address of the group. Accordingly, the direct links between the STA 120a and each of STAs 120b, 120c, and 120d, is torn down and no longer available.

Figure 9A:
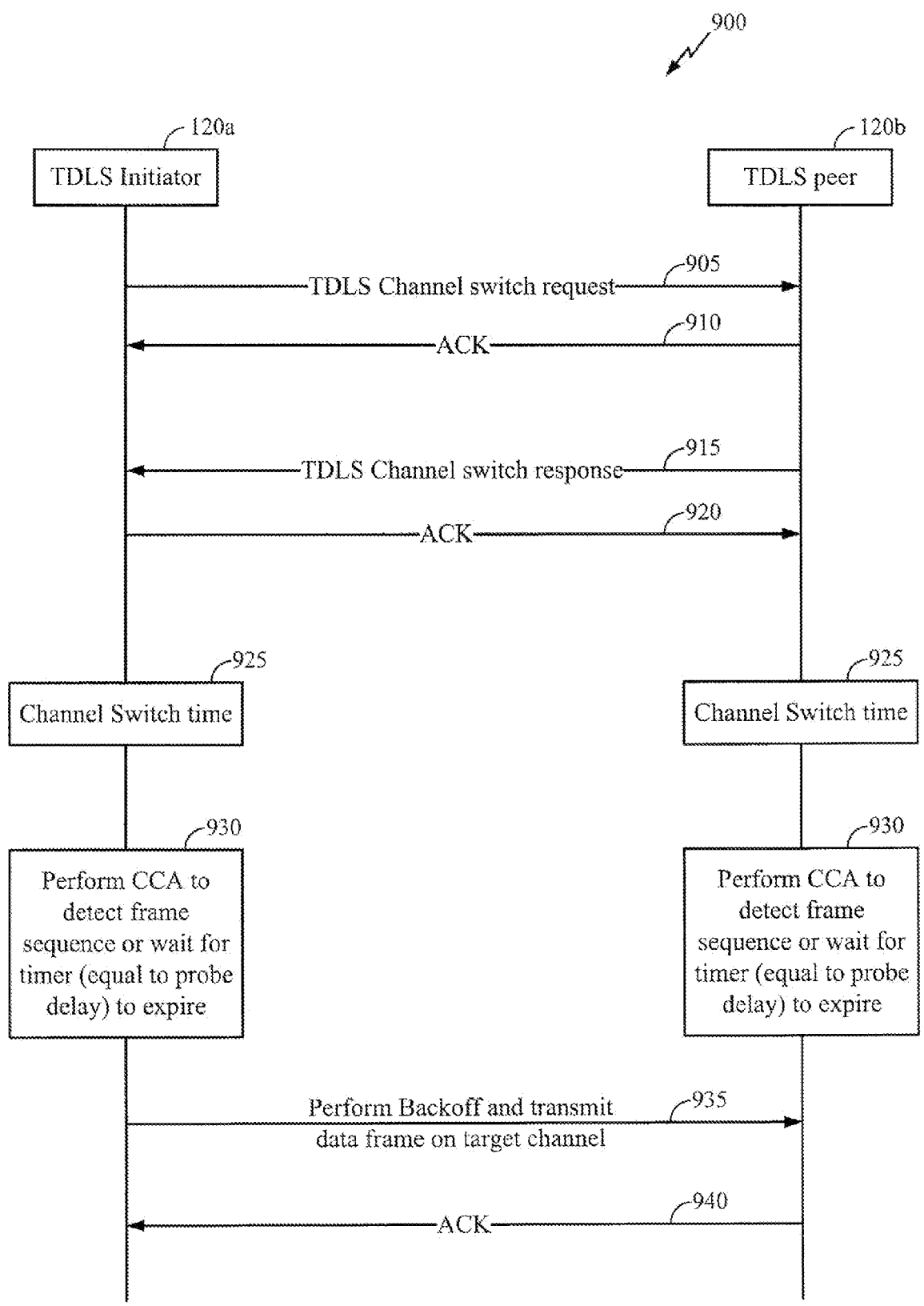
FIG. 9A illustrates an example process of switching communication channels in a TDLS system.

FIG. 9A illustrates an example process of switching communication channels in a TDLS system. In an embodiment, each STA may communicate with the AP 110 over a particular channel, referred to herein as the base channel. At any given point, a STA may decide to start communications on an "off" channel or target channel other than the base channel. To communicate over a direct link on a different channel, at 905 an initiator STA 120*a* sends a TDLS channel switch request frame to a STA 120*b*, where the frame indicates a target channel based on the channels and regulatory class supported by both the STA 120*a* and the STA 120*b*. At this time the STA 120*a* is in a power save (PS) mode with the AP 110. In PS mode, the STA 120*a* does not actively communicate with the AP 110. At 910, the STA 120*b* receives the request and enters a PS mode with the AP 110. The STA 120*b* further sends an acknowledgement (ACK) that the request is received to the STA 120*a*. At 915, the STA 120*b* further transmits a TDLS channel switch response frame to the STA 120*a*, and at a 920 the STA 120*a* sends an ACK that the response is received. At 925, the STA 120*a* and STA 120*b* switch to the target channel indicated in the channel switch request frame. At 930, the STA 120*a* and STA 120*b* each further perform a clear channel assessment (CCA) on the switched to channel until a frame sequences is detected by which the STAs can correctly set their network allocation vectors (NAVs), or until a period of time equal to a predefined time period, ProbeDelay, has transpired. At 935, the STA 120*a* transmits data on the target channel to the STA 120*b*. At 940, the STA 120*b* sends an ACK that the data is received. The STA 120*a* and STA 120*b* usually switch back to communication on the base channel with the AP before expiration of the delivery traffic indication message (DTIM). The STAs usually need to perform the above steps again to communicate on an off channel again.

Figure 9B:
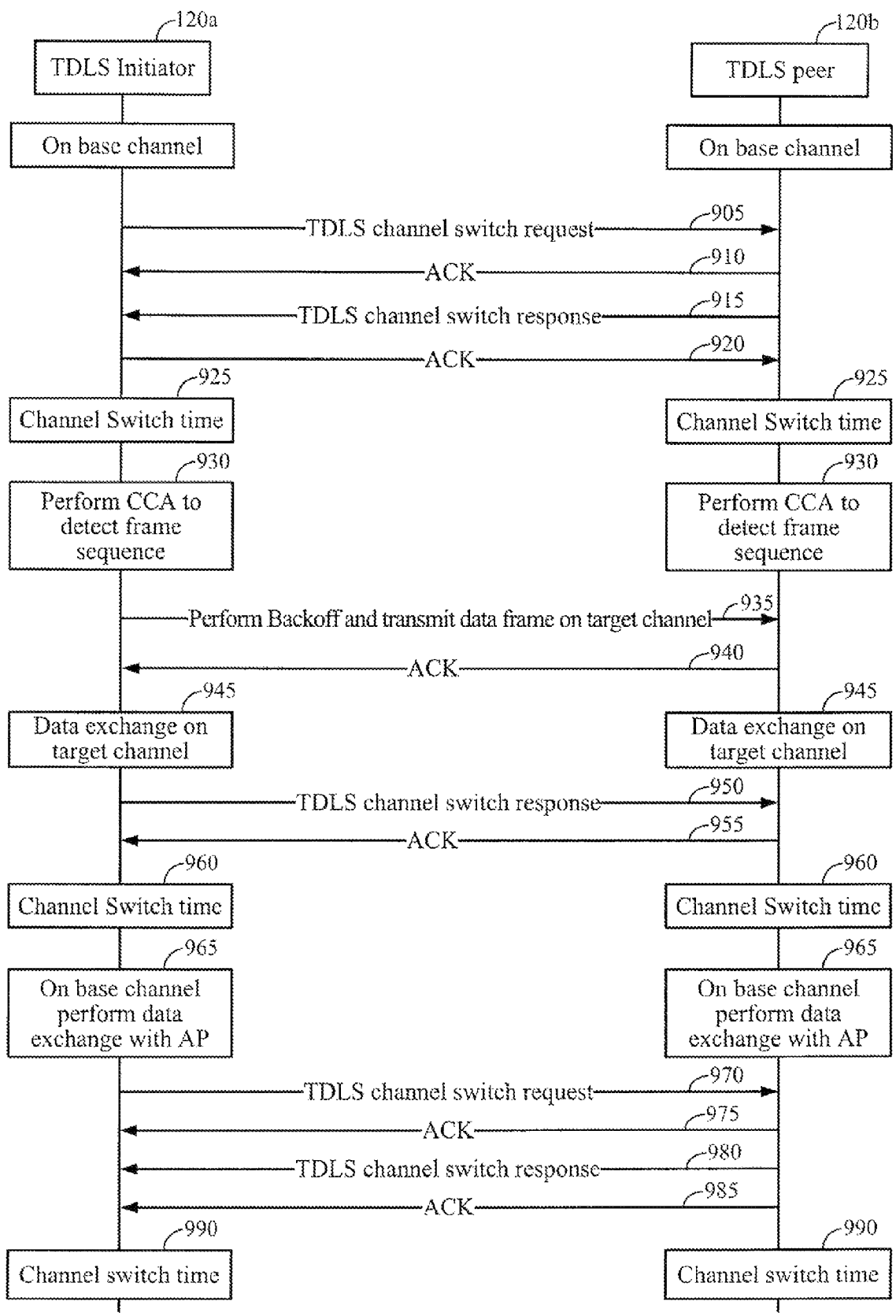
FIG. 9B illustrates another example process of switching communication channels in a TDLS system.

FIG. 9B illustrates another example process of switching communication channels in a TDLS system. The process of FIG. 9B begins with the same procedures 905-940 discussed above with respect to FIG. 9A. Continuing at 945, the STA 120*a* and the STA 120*b* exchange data on the target channel. At 950, the STA 120*a* sends another TDLS channel switch request frame to the STA 120*b* to switch to communication on the base channel. Next, at 955, the STA 120*b* receives the request and further sends an acknowledgement (ACK) that the request is received. At 960, the STA 120*a* and STA 120*b* then switch to the base channel indicated in the channel switch request frame. At 965, the STA 120*a* and the STA 120*b* exchange data with the AP 110. At 970, the STA 120*a* sends a TDLS channel switch request frame to the STA 120*b*, where the frame indicates the target channel based on the channels and regulatory class supported by both the STA 120*a* and the STA 120*b*. At this time the STA 120*a* is in a power save (PS) mode with the AP 110. In PS mode, the STA 120*a* does not actively communicate with the AP 110. At 975, the STA 120*b* receives the request and enters a PS mode with the AP 110 and further sends an acknowledgement (ACK) to the STA 120*a* that the request is received. At 980, the STA 120*b* further transmits a TDLS channel switch response frame to the STA 120*a*, and at 985 the STA 120*a* sends an ACK that the response is received. At 990, the STA 120*a* and STA 120*b* switch to the target channel indicated in the channel switch request frame.

Figure 10:
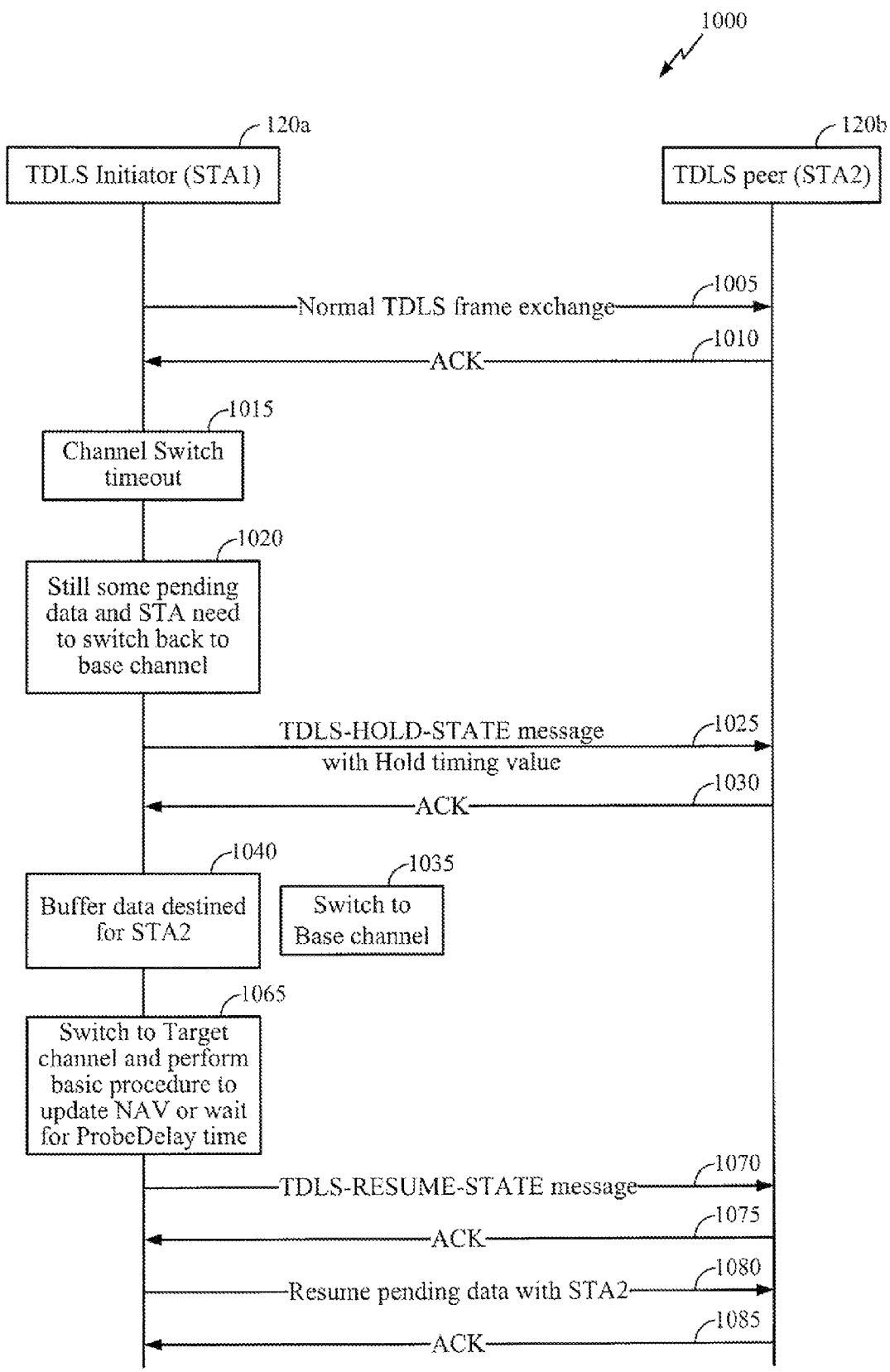
FIG. 10 illustrates an example process of using TDLS-HOLD-STATE and TDLS-RESUME-STATE messages to reduce the message exchange necessary for switching between communication on a base channel to communication on an off channel.

FIG. 10 illustrates an example process of using TDLS-HOLD-STATE and TDLS-RESUME-STATE messages to reduce the message exchange necessary for switching between communication on a base channel to communication on an off channel. FIG. 10 starts where STA 120*a* and STA 120*b* have performed one successful channel switch using the normal procedures, such as described with respect to FIG. 9A, so each are aware of the target channel and the channel properties. At 1005, the STA 120*a* sends a TDLS frame to the STA 120*b*. Continuing at 1010, the STA 120*b* sends an ACK to the STA 120*a* acknowledging receipt of the frame. Further, at 1015, the DTIM expires and the STAs need to communicate on the base channel to receive unicast/broadcast data. However, at 1020, STA 120*a* determines it requires more time to transfer data over the target channel, assuming the target channel has a higher link quality than the base channel. Accordingly, at 1025, the STA 120*a* transmits a TDLS-HOLD-STATE message to the STA 120*b* with the expected time T1 the STA 120*a* will take to come back to the target channel after communicating on the base channel. At 1030, the STA 120*b* sends an ACK to the STA 120*a*. At 1035, both STA 120*a* and STA 120*b* then return to the base channel. During the switching of channels, each of the STA 120*a* and the STA 120*b* maintain information about the target channel so communication can successfully be resumed. At 1040, the STA 120*a* may optionally buffer communication data that is to be sent over the target channel during this time period. Further, the STA 120*a* and STA 120*b* may optionally perform a frame exchange with the AP 110 to let the AP 110 know that each of the STA 120*a* and the STA 120*b* are still actively communicating. After optionally performing the frame exchange with the AP 110 to inform the AP 110 that the STAs 120*a* and 120*b* are actively communicating, the STA 120*a* and STA 120*b* may optionally perform another frame exchange with the AP 110 to inform the AP 110 that each of the STA 120*a* and 120*b* are entering a power save mode with respect to the links with the AP 110.

At 1065, the STA 120*a* returns to the target channel using the previously calculated channel properties. At 1070, the STA 120*a* transmits a TDLS-RESUME-STATE message to the STA 120*b* indicating data transfer can resume. At 1075, the STA 120*b* sends a response ACK. Further, the STA 120*a* may continue to send the TDLS-RESUME-STATE message until an ACK is received, and the STA 120*b* will buffer data for the STA 120*a* until the STA 120*a* sends the TDLS-RESUME-STATE message. At 1080 and 1085, the STA 120*a* and STA 120*b* may then exchange data over the target channel.

In an embodiment, the time T1 the STA 120*a* will take to come back to the target channel after communicating on the base channel may be calculated as T1=time to switch target to base channel (T2)+time to listen for the current DTIM and take necessary action (T3)+time to switch back to target channel (T4)+time to detect frame exchange or a time equal to probe timing (T5).

In an embodiment, T3 may be calculated as follows: the time to switch back to the base channel and listen for the DTIM, if the DTIM indicates that broadcast/multicast data is pending, and the time ΔT to wait to receive the broadcast/multicast frames, otherwise, send a QoS NULL frame to keep the link alive.

In another embodiment, ΔT=timing that is calculated based on profile settings maintained in the STA 120*a*. Depending on the type of data stream being used on the target channel, latency of the T3 timer is adjusted.

A STA that has setup a direct link with another STA may occasionally enter a power savings mode. For example, in an embodiment, a STA 120*a* may enter a power save mode with respect to a direct link with another STA 120*b*. As part of entering the power save mode, the STA 120*a* informs the STA 120*b* that it is entering the power save mode. In an embodiment, the STA 120*a* transmits over the direct link to the STA 120*b* an acknowledged MAC protocol data unit (MPDU) or a null data frame with the PM bit set to 1 to enter a power save mode on the direct link with the STA 120*b*. The STA 120*a* in the power save mode is referred to as a peer unscheduled automatic power save delivery (Peer U-APSD (PU)) sleep STA 120*a* or a peer sleep STA 120*a*. The receiving STA 120*b* on the direct link is referred to as peer buffer STA 120*b*. The power save status is only for the particular link. In an embodiment, the peer buffer STA 120*b* will buffer data it has to communicate with the PU sleep STA 120*a* while the PU sleep STA 120*a* is in the power save mode. The PU buffer STA 120*b* transmits the buffered data when the PU sleep STA 120*a* exits the power save mode.

For example, when the PU buffer STA 120*b* has buffered frames for the PU sleep STA 120*a*, the PU buffer STA 120*b* transmits a peer traffic indication (PTI) frame to the PU sleep STA 120*a* through the AP 110. The PU buffer STA 120*b* may send the PTI frame to the AP 110 in a first beacon interval (BI). The AP 110 buffers the PTI frame and delivers it to the PU sleep STA 120*a* once the PU sleep STA 120*a* comes out of the power saving mode. The AP 110 may deliver the PTI frame to the PU sleep STA 120*a* during a second BI that comes after the first BI. The PU sleep STA 120*a* then sends a trigger frame (e.g., a peer traffic response (PTR)) to the PU buffer STA 120*b* over the direct link to initiate communication.

However, once the PU sleep STA 120*a* wakes up, it does not have information regarding the quality of the direct link between the PU sleep STA 120*a* and the PU buffer STA 120*b*, as the quality may have changed during the sleep period. Accordingly, the trigger frame may not be deliverable over the direct link.

Figure 11A:
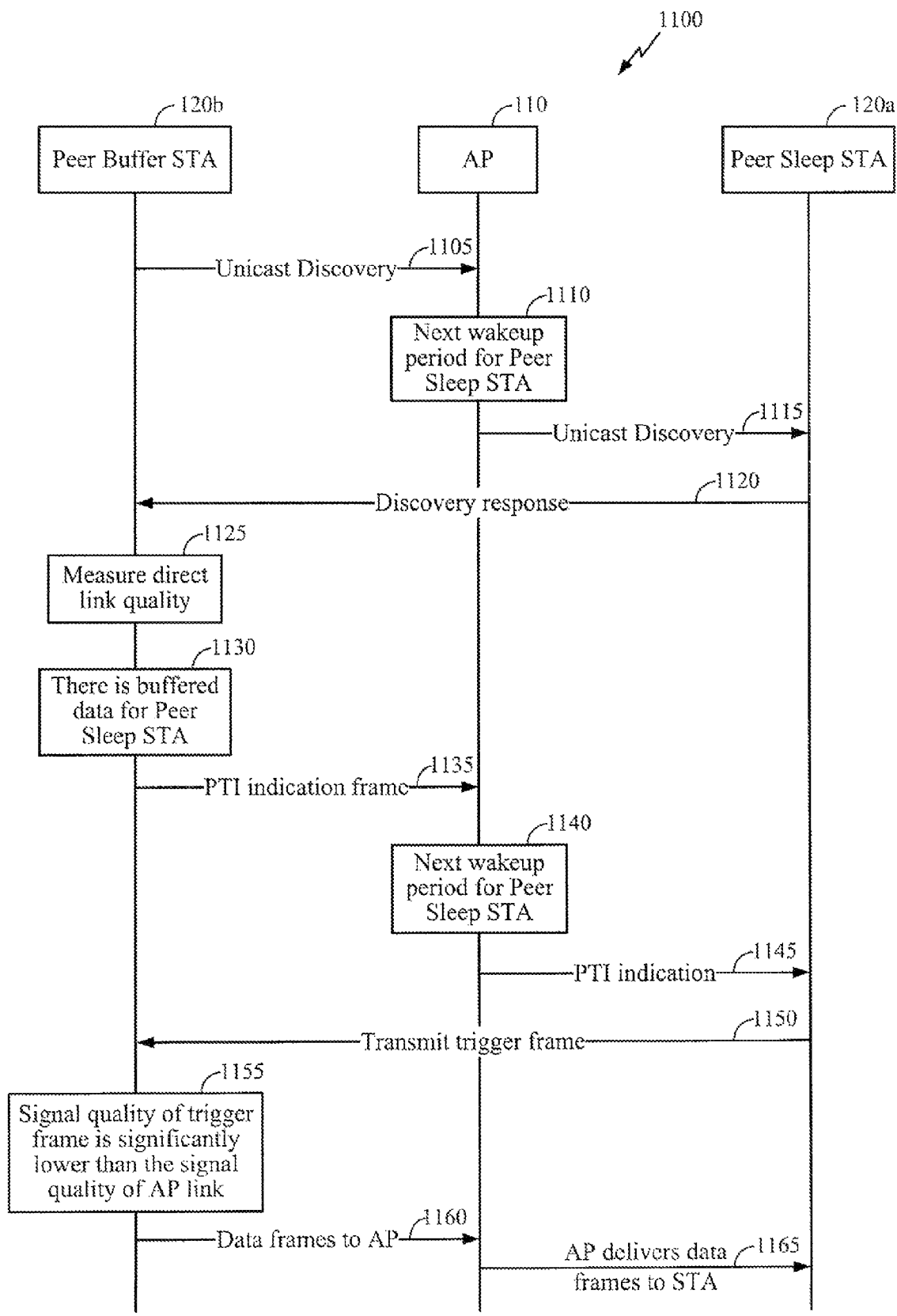
FIG. 11A illustrates an example process for determining link quality between STAs after waking from a sleep period.

FIG. 11A illustrates an example process for determining link quality between STAs after waking from a sleep period. The process allows the PU buffer STA 120*b* to measure direct link quality with the PU sleep STA 120*a* in a power saving mode by periodically sending unicast discovery request frames, which are transmitted on the AP link and for which responses are received on the direct link. The PU buffer STA 120*b* may utilize this information to determine whether to use the AP link or the direct link to send data to the PU sleep STA 120*a*. For example, if the measured link quality of the direct link is low, such as lower than a link quality of the AP link, the PU buffer STA 120*b* may choose to send data to the PU sleep STA 120*a* over the AP links. The above process may be performed after the PU buffer STA 120*b* and the PU sleep STA 120*a* setup the direct link between each other, and the PU sleep STA 120*a* enters into PU power save. During such time the PU buffer STA 120*b* and PU sleep STA 120*a* may move apart from each other geographically, thus degrading the link quality between the STAs.

In an embodiment, at 1105, the PU buffer STA 120*b* sends a unicast discovery request frame to the AP 110. At 1110, the AP 110 waits for a wake up period of the PU sleep STA 120*a*. At 1115, during a wake up period of the PU sleep STA 120*a*, the AP 110 transmits the unicast discovery request frame to the PU sleep STA 120*a*. At 1120, the PU sleep STA 120*a* sends a response over the direct link to the PU buffer STA 120*b*. At 1125, the PU buffer STA 120*b* determines the link quality of the direct link based on the received response. The PU buffer STA 120*b* may periodically repeat procedures described at 1105 to 1125 until there is buffered data for the PU sleep STA 120*a*. Through such repetition, the PU buffer STA 120*b* updates the determined link quality of the direct link.

At 1130, the PU buffer STA 120*b* determines that there are buffered data for the PU sleep STA 120*a*. At 1135, the PU buffer STA 120*b* transmits a PTI indication frame to the AP 110. After transmitting the PTI, the PU buffer STA 120*b* may start a timer T1, where the timer T1 is equal to 2 or 3 BI. At 1140, the AP 110 waits for a wake up period of the PU sleep STA 120*a*. At 1145, during a wake up period of the PU sleep STA 120*a*, the AP 110 transmits the PTI indication frame to the PU sleep STA 120*a*. At 1150, the PU sleep STA 120*a* attempts to send a trigger frame to the PU buffer STA 120*b* over the direct link.

If at 1155 the PU buffer STA 120*b* determines link quality (e.g., signal to noise ratio (SNR)) on the direct link is low (e.g., less than the link quality of the AP link) according to the last received response to the discovery request from the PU sleep STA 120*a*, or no trigger is received within T1 also meaning the link quality of the direct link is low, the PU buffer STA 120*b* can assume the direct link is of bad quality or not available. Accordingly, at 1160, the PU buffer STA 120*b* may transmit the buffered data over the AP link to the AP 110, and at 1165, the AP 110 transmits the data to the PU sleep STA 120*a*. If the link quality is good (e.g., higher than the link quality of the AP link) and the trigger is received, the PU buffer STA 120*b* may send the buffered data over the direct link to the PU sleep STA 120*a*. In some embodiments, determination of sufficient link quality for transmitting data over the direct link instead of the AP link comprises determining the direct link is available for transmission.

Figure 11B:
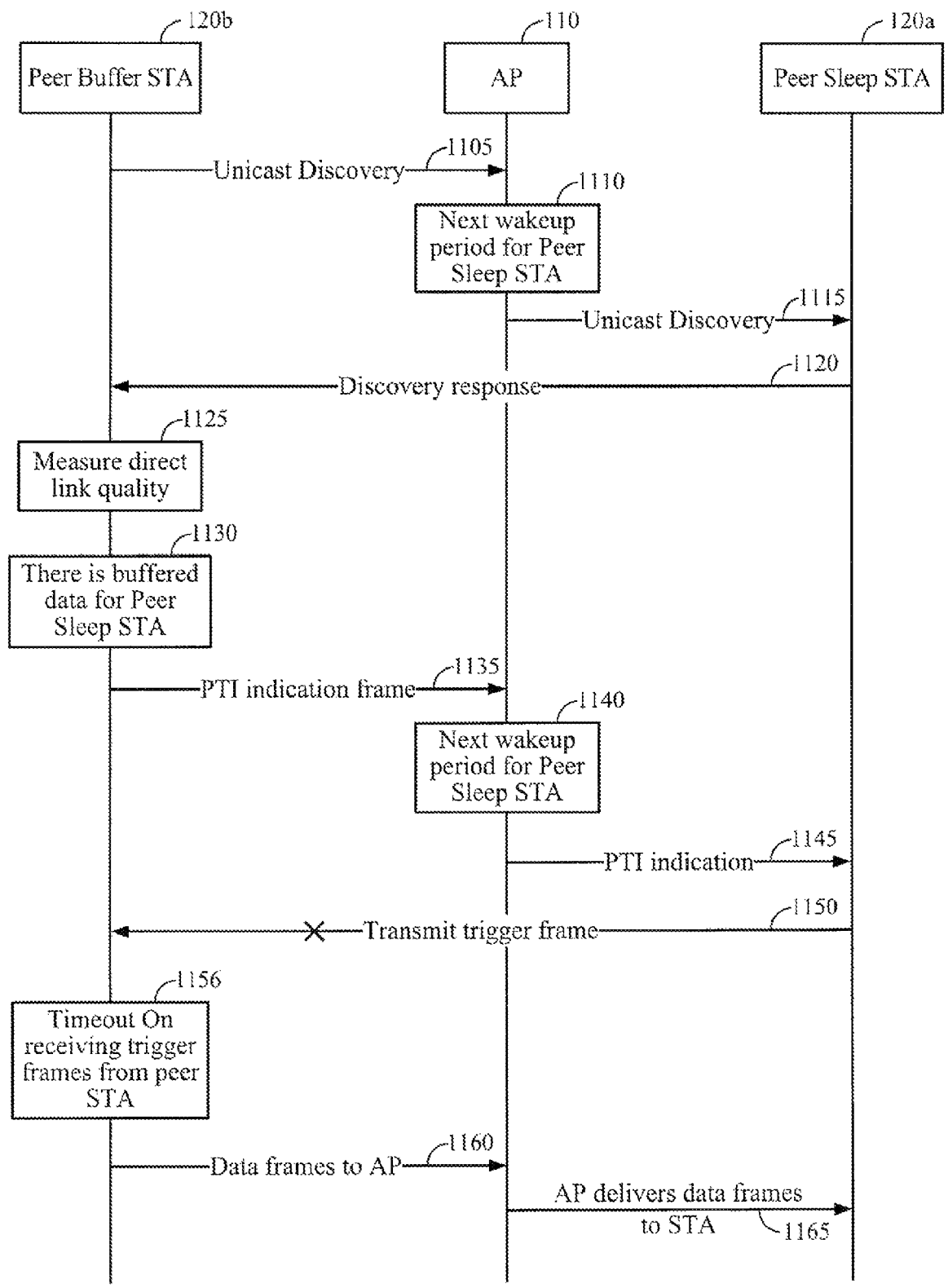
FIG. 11B illustrates another example process for determining link quality between STAs after waking from a sleep period.

FIG. 11B illustrates another exemplary process for determining link quality between STAs after waking from a sleep period. The process of FIG. 11B begins with the same procedures described by 1105-1150 discussed above with respect to FIG. 11A. However, in the process of FIG. 11B, transmission of the trigger frame from the PU sleep STA 120*a* to the PU buffer STA 120*b* is not successful. Thus, at 1156, the PU buffer STA 120*b* determines that no trigger is received within the time period T1. The PU buffer STA 120*b* therefore assumes the direct link is of bad quality or not available. Accordingly, at 1160, the PU buffer STA 120*b* may transmit the buffered data over the AP link to the AP 110, and at 1165, the AP 110 transmits the data to the PU sleep STA 120*a*.

As discussed above with respect to FIGS. 11A and 11B, a PU buffer STA 120*b* sends a PTI frame to the AP 110 when there is buffered data for the PU sleep STA 120*a* in the power saving mode. In an embodiment, if unscheduled automatic power save delivery (U-APSD) or quality of service (QoS) with the same parameters as the QoS of the direct link is not enabled on the AP link between the PU sleep STA 120*a* and the AP 110, QoS on the direct link between the PU buffer STA 120*b* and the PU sleep STA 120*a* can degrade. For example, the PU sleep STA 120*a* may not transmit a trigger frame to the PU buffer STA 120*b* within a certain time period (e.g., time period T1 discussed above with respect to FIGS. 11A and 11B) required by QoS, where the time period may be measured between the time of transmission of the PTI frame from the PU buffer STA 120*b* to the AP 110 to the time of receipt of the trigger frame by the PU buffer STA 120*b* from the PU sleep STA 120*a*. This can occur where a time interval at the AP 110 required to communicate with the PU sleep STA 120*a* is greater than the time period required by QoS. For example, the AP 110 may have a beacon interval (BI). In each BI, the AP 110 may send a traffic indicator map (TIM) to the PU sleep STA 120*a* that indicates whether or not the AP 100 has data buffered (e.g., a PTI frame from the PU buffer STA 120*b*) for the PU sleep STA 120*a*. In an embodiment, the TIM is only sent when there is buffered data. If this BI is too long, the PU sleep STA 120*a* may not be notified of the buffered data in sufficient time to ensure QoS.

Accordingly, in an embodiment, to ensure that QoS is met on the direct link, when the PU sleep STA 120*a* initially starts a direct link with the PU buffer STA 120*b* with QoS parameters, the PU sleep STA 120*a* uses the same QoS parameters to enable U-APSD with the AP 110 before communicating with the PU buffer STA 120*b* over the direct link.

In one embodiment, enabling the same QoS involves setting at the AP 110 a service interval (SI), which is a maximum time period the AP 110 waits after receiving a PTI frame from the PU buffer STA 120b to transmit the PTI to the PU sleep STA 120a. The SI may be shorter than the BI and selected such that delivery of data between the STAs meets QoS on the direct link.

Accordingly, the QoS parameters for generating trigger frames on the AP link are derived from the QoS parameters used for the direct link. Further, the PTI indication frame is sent using the same access category (AC) used by traffic on the direct link. The PTI indication frame is then received by the PU sleep STA 120a using trigger frame generation for the same AC for which QoS data is getting setup.

Figure 12:
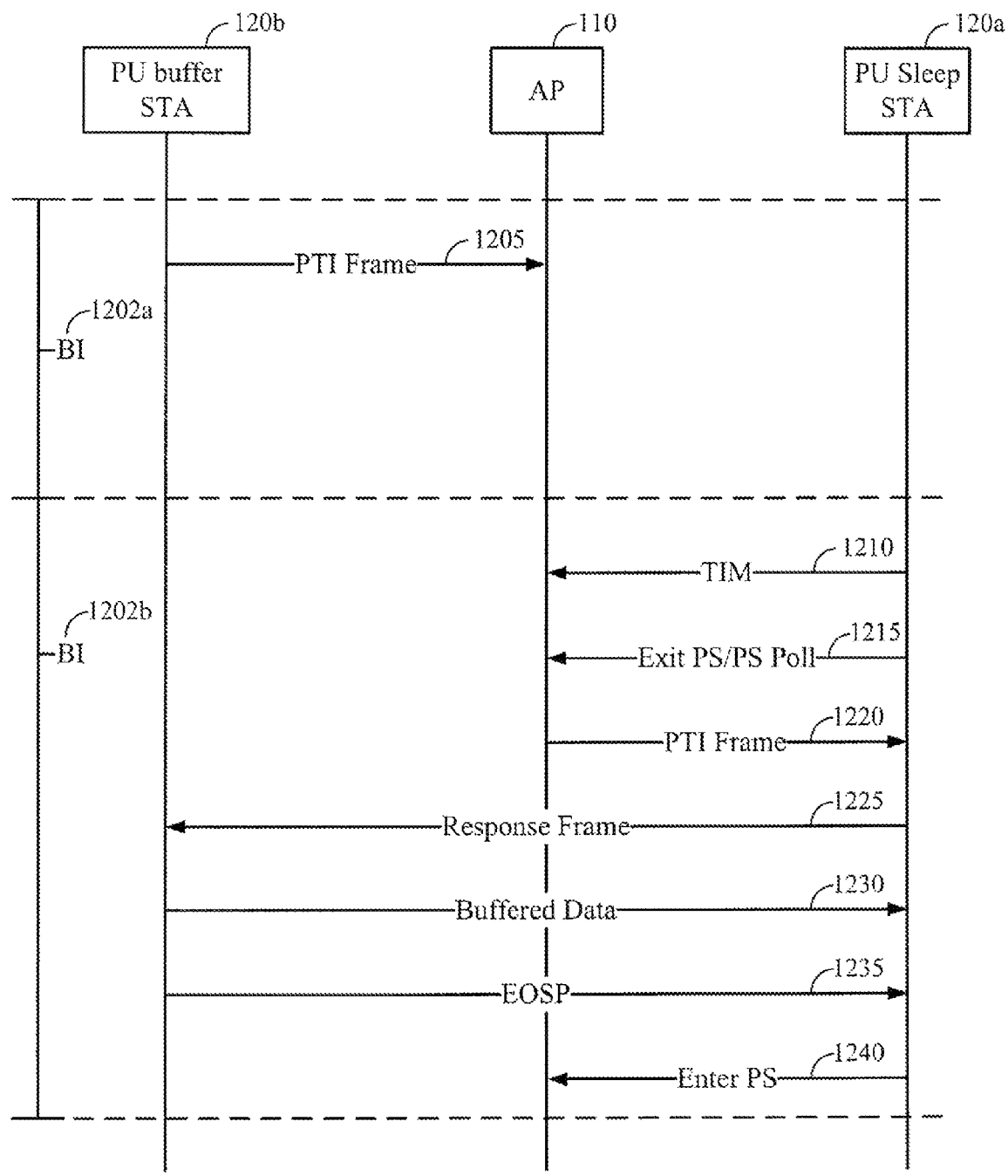
FIG. 12 illustrates a process for a data exchange where QoS is not enabled with the access point.

FIG. 12 illustrates a process for a data exchange where QoS is not enabled with the access point. At a first step 1205, the PU buffer STA 120b transmits a peer traffic indication (PTI) frame to the AP 110. The PTI frame informs the AP 110 that the PU buffer STA 120b has buffered data for transmission to the PU sleep STA 120a. The PTI frame may be transferred to the AP 110 in a first beacon interval (BI) 1202a of the AP 110. After the first BI 1202a, the process continues at 1210 where, in a BI 1202b, the AP 110 transmits a TIM to the PU sleep STA 120a indicating that the PU buffer STA 120b has buffered data for the PU sleep STA 120a. Next, at 1215, the PU sleep STA 120a sends a QoS NULL frame with the PM set to 0 to the AP 110 to indicate the PU sleep STA 120a has exited a PS mode. Further, at 1220, the AP 110 delivers the PTI to the PU sleep STA 120a. Continuing at 1225, the PU sleep STA 120a sends a peer traffic response frame to the PU buffer STA 120b over the direct link. Next, at 1230, the PU buffer STA 120b, in response to receiving the peer traffic response frame, starts sending buffered data to the PU sleep STA 120a over the direct link. At 1235, the PU buffer STA 120b sends an end of service period indicator to the PU sleep STA 120a indicating that the PU sleep STA 120a can go back to a PS mode as the data has been sent. At 1240, the PU sleep STA 120a sends a QOS NULL frame with the PM set to 1 to the AP 110 to indicate that the PU sleep STA 120a has entered a PS mode. The time between transmission of the PTI frame by the PU buffer STA 120b and the receipt of the peer traffic response frame from the PU sleep STA 120a is the time between steps 1205 and 1225. This interval includes the BI 1202a. Thus, depending on the length of the BI 1202a, the PU sleep STA 120a may not be notified of the buffered data in sufficient time to ensure QoS.

Figure 13:
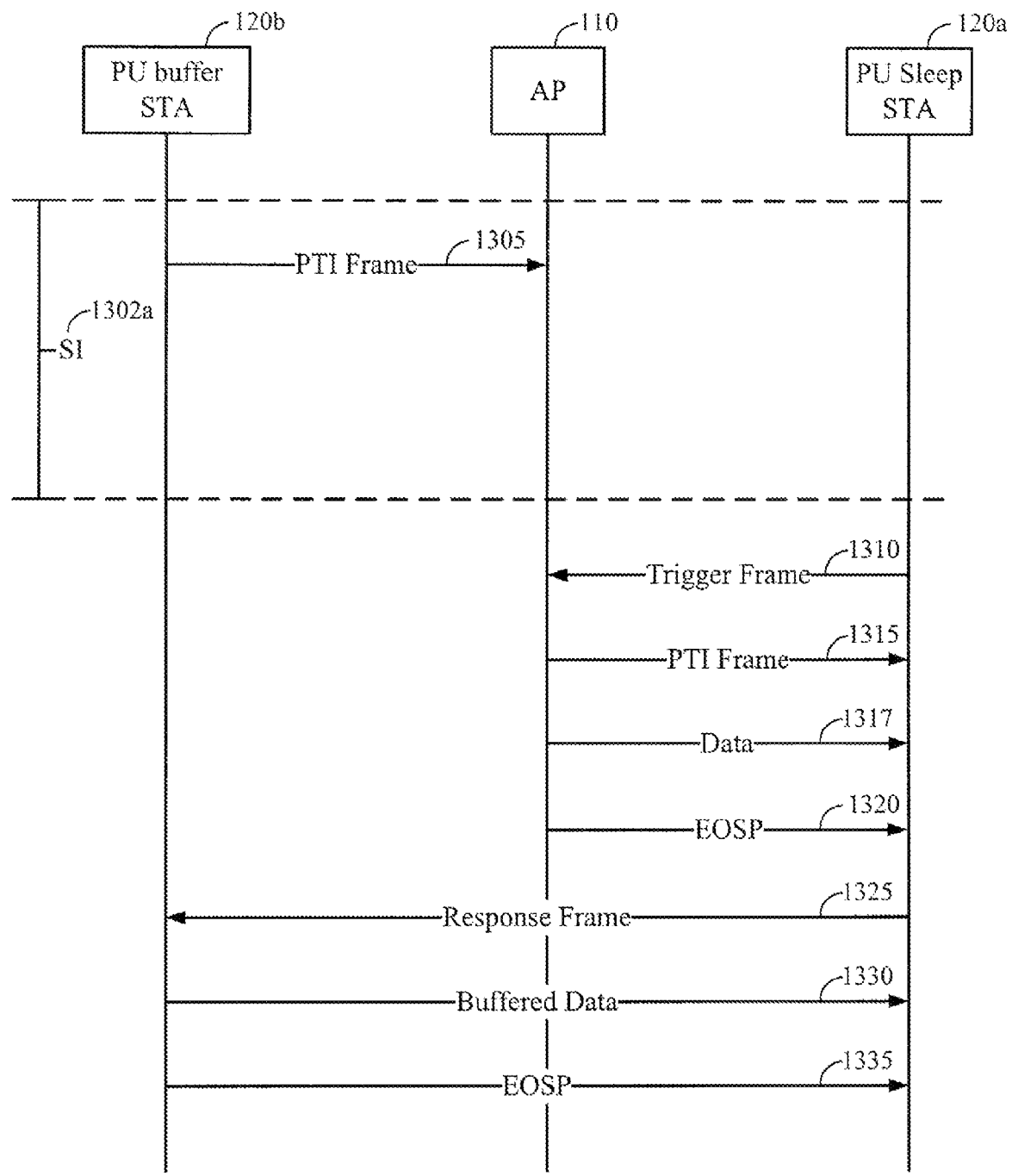
FIG. 13 illustrates a process for data exchange that ensures QoS over the direct link.

FIG. 13 illustrates process for data exchange that ensures QoS over the direct link. It is assumed that the PU sleep STA 120a starts a direct link with the PU buffer STA 1206 with QoS parameters and that the PU sleep STA 120a uses the same QoS parameters to enable U-APSD with the AP 110. At 1305, within a first service interval 1302a, the PU buffer STA 102b transmits a PTI frame to the AP 110 within a particular AC, indicating that the PU buffer STA 120b has data buffered for the PU sleep STA 120a. After the first service interval 1302a expires, the process continues at 1310, where the PU sleep STA 120a sends a trigger frame to the AP 110 to start a service period. At 1315, the AP 110 in response to the trigger frame, starts the service period by sending downlink frames including the PTI frame to the PU sleep STA 120a. At 1320, the AP 110 transmits an end of service period indicator to the PU sleep STA 120a to indicate that the service period has ended. At 1325, the PU sleep STA 120a sends a peer traffic response frame to the PU buffer STA 120b over the direct link. At 1330, the PU buffer STA 120b, in response to receiving the peer traffic response frame, starts sending buffered data to the PU sleep STA 120a over the direct link. At 1335, the PU buffer STA 120b also sends an end of service period (EOSP) indicator to the PU sleep STA 120a indicating that the PU sleep STA 120a can go back to a PS mode as the data has been sent. The time between transmission of the PTI frame by the PU buffer STA 120b and the receipt of the peer traffic response frame from the PU sleep STA 120a is the time between steps 1305 and 1325. This interval need not include waiting for a BI of the AP 110. Rather, this interval is dependant on the service interval 1302a. The service interval 1302a is based on the set QoS parameters. Thus, the PU sleep STA 120a is notified of the buffered data in sufficient time to ensure QoS.

One of ordinary skill in the art should understand that processes described herein are merely illustrative. Steps of the processes may be removed, additional steps may be added, and/or the order of steps changed, while still being consistent with the principles and novel features disclosed herein.

Figure 14:
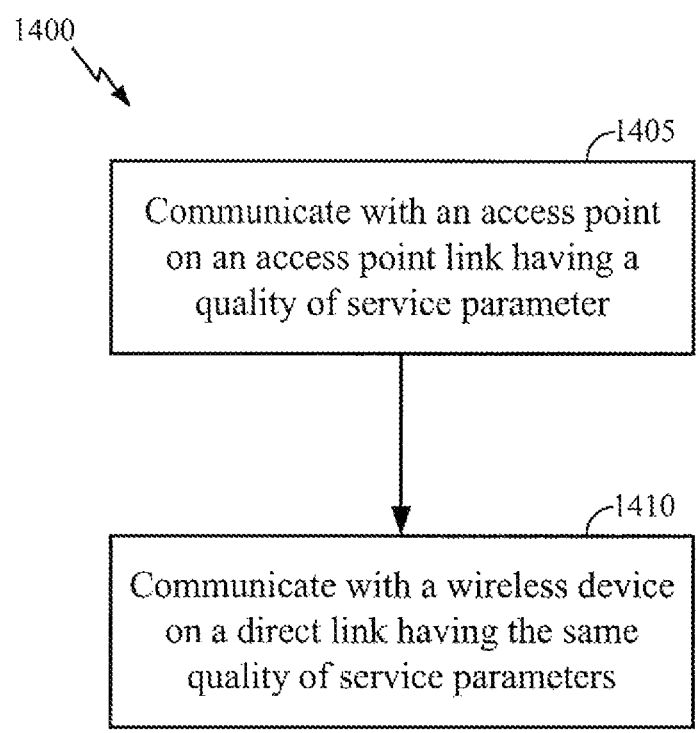
FIG. 14 illustrates an aspect of a method for ensuring QoS over the direct link.

FIG. 14 illustrates an aspect of a method 1400 for ensuring QoS over the direct link. The method 1400 may share some aspects with the process 1300 described above with respect to FIG. 13. At 1405, the PU sleep STA 120a communicates with the AP 110 on an access point link having at least one quality of service parameter. At 1410, the PU sleep STA 120a communicates with the PU buffer STA 120b over a direct link having the same quality of service parameter as the access point link.

Figure 15:
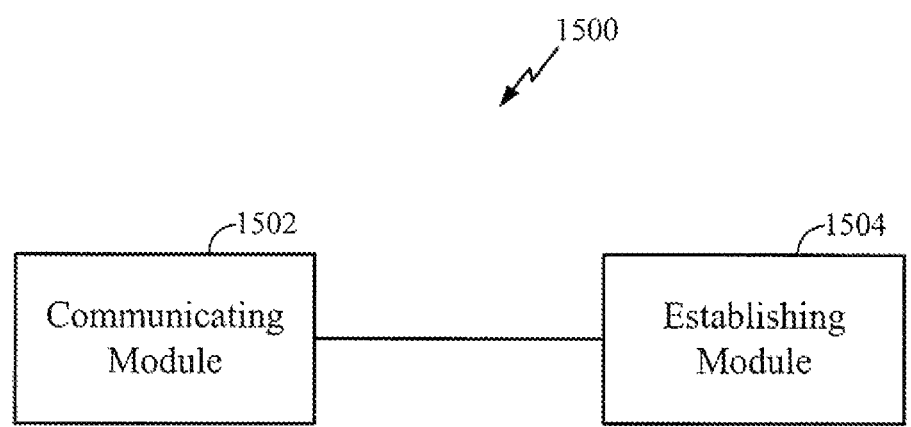
FIG. 15 is a functional block diagram of another exemplary wireless device that may be employed within the wireless communication system of FIG. 1.

FIG. 15 is a functional block diagram of another exemplary wireless device 1500 that may be employed within the wireless communication system 100. The device 1500 comprises a communicating module 1502 for communicating on data links. The communicating module 1502 may be configured to perform one or more of the functions discussed above with respect to the process 1300 illustrated in FIG. 13 and the method 1400 illustrated in FIG. 14. The communicating module 1502 may correspond to the memory 306, the processor 304, the DSP 320, the transmitter 310, and/or the receiver 312, for example. The device 1500 further comprises an establishing module 1504 for establishing QoS parameters on data links. The establishing module 1504 may be configured to perform one or more of the functions discussed above with respect to the process 1300 illustrated in FIG. 13 and the method 1400 illustrated in FIG. 14. The establishing module 1504 may correspond to the memory 306, the processor 304, and/or the DSP 320, for example.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method implemented in a wireless apparatus, the method comprising:
communicating with an access point on an access point link having unscheduled automatic power save delivery disabled, wherein communication on the access point link is performed using an access category;

starting a direct link with another wireless apparatus using at least one quality of service parameter;

enabling said unscheduled automatic power save delivery on the access point link using the same at least one quality of service parameter as the direct link; and communicating with the another wireless apparatus on the direct link, the direct link being formed using tunneled direct link setup, wherein communication on the direct link is performed using the same access category as the access point link.

2. The method of claim 1, wherein the access point link and the direct link are formed within a wireless local area network.

3. The method of claim 1, wherein the at least one quality of service parameter comprises a maximum delay for transmission of data.

4. The method of claim 1, further comprising establishing the at least one quality of service parameter for the direct link based on the at least one quality of service parameter for the access point link.

5. The method of claim 1, wherein the at least one quality of service parameter comprises a service interval indicating a maximum time period that the access point will wait.

6. The method of claim 5, wherein the service interval is shorter than a beacon interval used for communication.

7. A wireless apparatus comprising:
a memory; and
a processor coupled to the memory, the memory and processor being cooperatively configured to:
communicate with an access point on an access point link having unscheduled automatic power save delivery disabled, wherein communication on the access point link is performed using an access category;
start a direct link with another wireless apparatus using at least one quality of service parameter,
enable said unscheduled automatic power save delivery on the access point link using the same at least one quality of service parameter as the direct link, and
communicate with another the wireless apparatus on the direct link having at least one quality of service parameter, the direct link being formed using tunneled direct link setup, wherein communication on the direct link is performed using the same access category as the access point link.

8. The wireless apparatus of claim 7, wherein the access point link and the direct link are formed within a wireless local area network.

9. The wireless apparatus of claim 7, wherein the at least one quality of service parameter comprises a maximum delay for transmission of data.

10. The wireless apparatus of claim 7, wherein the memory and processor are further cooperatively configured to establish the at least one quality of service parameter for the direct link based on the at least one quality of service parameter for the access point link.

11. The wireless apparatus of claim 7, wherein the at least one quality of service parameter comprises a service interval.

12. The wireless apparatus of claim 11, wherein the service interval is shorter than a beacon interval used for communication.

13. A wireless apparatus comprising:
means for communicating with an access point on an access point link having unscheduled automatic power save delivery disabled, wherein communication on the access point link is performed using an access category;

means for starting a direct link with another wireless apparatus using at least one quality of service parameter;

means for enabling said unscheduled automatic power save delivery on the access point link using the same at least one quality of service parameter as the direct link; and means for communicating with the another wireless apparatus on the direct link, the direct link being formed using tunneled direct link setup, wherein communication on the direct link is performed using the same access category as the access point link.

14. The wireless apparatus of claim 13, wherein the access point link and the direct link are formed within a wireless local area network.

15. The wireless apparatus of claim 13, wherein the at least one quality of service parameter comprises a maximum delay for transmission of data.

16. The wireless apparatus of claim 13, further comprising means for establishing the at least one quality of service parameter for the direct link based on the at least one quality of service parameter for the access point link.

17. The wireless apparatus of claim 13, wherein the at least one quality of service parameter comprises a service interval.

18. The wireless apparatus of claim 17, wherein the service interval is shorter than a beacon interval used for communication.

19. A non-transitory computer readable medium comprising instructions that when executed cause an apparatus to:
communicate with an access point on an access point link to having unscheduled automatic power save delivery disabled, wherein communication on the access point link is performed using an access category;
start a direct link with another wireless apparatus using at least one quality of service parameter;
enable said unscheduled automatic power save delivery on the access point link using the same at least one quality of service parameter as the direct link; and
communicate with the another wireless apparatus on the direct link, the direct link being formed using tunneled direct link setup, wherein communication on the direct link is performed using the same access category as the access point link.

20. The non-transitory computer readable medium of claim 19, wherein the access point link and the direct link are formed within a wireless local area network.

21. The non-transitory computer readable medium of claim 19, wherein the at least one quality of service parameter comprises a maximum delay for transmission of data.

22. The non-transitory computer readable medium of claim 19, wherein the instructions when executed further cause the apparatus to establish the at least one quality of service parameter for the direct link based on the at least one quality of service parameter for the access point link.

23. The non-transitory computer readable medium of claim 19, wherein the at least one quality of service parameter comprises a service interval.

24. The non-transitory computer readable medium of claim 23, wherein the service interval is shorter than a beacon interval used for communication.

* * * * *